(12) United States Patent
Sivakumar et al.

(10) Patent No.: US 11,594,001 B2
(45) Date of Patent: Feb. 28, 2023

(54) METHODS AND SYSTEMS FOR GENERATING THREE-DIMENSIONAL IMAGES THAT ENABLE IMPROVED VISUALIZATION AND INTERACTION WITH OBJECTS IN THE THREE-DIMENSIONAL IMAGES

(71) Applicant: Rapiscan Systems, Inc., Torrance, CA (US)

(72) Inventors: Mala Sivakumar, Fremont, CA (US); Thomas Brown, Dublin, CA (US); Karthik Krishnan, Bangalore (IN)

(73) Assignee: Rapiscan Systems, Inc., Torrance, CA (US)

( * ) Notice: Subject to any disclaimer, the term of this patent is extended or adjusted under 35 U.S.C. 154(b) by 157 days.

(21) Appl. No.: 16/928,983

(22) Filed: Jul. 14, 2020

(65) Prior Publication Data
US 2021/0225088 A1    Jul. 22, 2021

Related U.S. Application Data

(60) Provisional application No. 62/963,494, filed on Jan. 20, 2020.

(51) Int. Cl.
*G06T 19/20* (2011.01)
*G06T 11/00* (2006.01)
(Continued)

(52) U.S. Cl.
CPC .............. *G06T 19/20* (2013.01); *G01N 23/04* (2013.01); *G01N 23/083* (2013.01); *G01N 23/10* (2013.01);
(Continued)

(58) Field of Classification Search
CPC ...... G06T 19/20; G06T 7/0002; G06T 11/008; G06T 13/20; G06T 2200/24;
(Continued)

(56) References Cited

U.S. PATENT DOCUMENTS 4,472,822 A    9/1984 Swift
5,642,394 A *  6/1997 Rothschild .......... G01N 23/207
                                                   378/57

(Continued)

FOREIGN PATENT DOCUMENTS

WO    1998002763 A1 *  1/1998
WO    2008024825 A2    2/2008

OTHER PUBLICATIONS

Domingo Mery, "Computer Vision for X-Ray Testing: Imaging, Systems, Image Databases, and Algorithms", ©Springer International Publishing Switzerland 2015 (Year: 2015).*

(Continued)

*Primary Examiner* — Michael Le
(74) *Attorney, Agent, or Firm* — Novel IP

(57) ABSTRACT

In some embodiments, the present specification describes methods for displaying a three-dimensional image of an isolated threat object or region of interest with a single touch or click and providing spatial and contextual information relative to the object, while also executing a view dependent virtual cut-away or rendering occluding portions of the reconstructed image data as transparent. In some embodiments, the method includes allowing operators to associate audio comments with a scan image of an object. In some embodiments, the method also includes highlighting a plurality of voxels, which are indicative of at least one potential threat item, in a mask having a plurality of variable color intensities, where the intensities may be varied based on the potential threat items.

22 Claims, 23 Drawing Sheets

(51) Int. Cl.
*G06T 7/00* (2017.01)
*G06F 3/16* (2006.01)
*G01N 23/04* (2018.01)
*G01N 23/10* (2018.01)
*G01N 23/083* (2018.01)
*G06T 13/20* (2011.01)

(52) U.S. Cl.
CPC ............ *G06F 3/165* (2013.01); *G06T 7/0002* (2013.01); *G06T 11/008* (2013.01); *G06T 13/20* (2013.01); *G01N 2223/3307* (2013.01); *G01N 2223/401* (2013.01); *G01N 2223/421* (2013.01); *G01N 2223/639* (2013.01); *G01N 2223/643* (2013.01); *G06T 2200/24* (2013.01); *G06T 2219/2012* (2013.01)

(58) Field of Classification Search
CPC ... G06T 2219/2012; G06T 2207/10081; G06T 2207/30112; G06T 2219/004; G06T 7/0004; G01N 23/04; G01N 23/083; G01N 23/10; G01N 2223/3307; G01N 2223/401; G01N 2223/421; G01N 2223/639; G01N 2223/643; G01N 2223/501; G01N 23/046; G06F 3/165
See application file for complete search history.

(56) References Cited

U.S. PATENT DOCUMENTS

| | | |
|---|---|---|
| 6,236,709 B1 | 5/2001 | Perry |
| 7,177,391 B2 | 2/2007 | Chapin |
| 7,261,466 B2 | 8/2007 | Bhatt |
| 7,349,525 B2 | 3/2008 | Morton |
| 7,354,197 B2 | 4/2008 | Bhatt |
| 7,376,218 B2 | 5/2008 | Chapin |
| 7,440,543 B2 | 10/2008 | Morton |
| 7,490,984 B2 | 2/2009 | Bhatt |
| 7,505,563 B2 | 3/2009 | Morton |
| 7,510,324 B2 | 3/2009 | Bhatt |
| 7,512,215 B2 | 3/2009 | Morton |
| 7,551,714 B2 | 6/2009 | Rothschild |
| 7,551,718 B2 | 6/2009 | Rothschild |
| 7,555,099 B2 | 6/2009 | Rothschild |
| 7,564,939 B2 | 7/2009 | Morton |
| 7,664,230 B2 | 2/2010 | Morton |
| 7,684,538 B2 | 3/2010 | Morton |
| 7,724,868 B2 | 5/2010 | Morton |
| 7,864,920 B2 | 1/2011 | Rothschild |
| 7,876,879 B2 | 1/2011 | Morton |
| 7,903,789 B2 | 3/2011 | Morton |
| 7,924,979 B2 | 4/2011 | Rothschild |
| 7,929,663 B2 | 4/2011 | Morton |
| 7,949,101 B2 | 5/2011 | Morton |
| 7,995,707 B2 | 8/2011 | Rothschild |
| 8,039,812 B1 | 10/2011 | Crocker |
| 8,085,897 B2 | 12/2011 | Morton |
| 8,094,784 B2 | 1/2012 | Morton |
| 8,135,110 B2 | 3/2012 | Morton |
| 8,204,173 B2 | 6/2012 | Betcke |
| 8,223,919 B2 | 7/2012 | Morton |
| 8,243,876 B2 | 8/2012 | Morton |
| 8,311,313 B1 | 11/2012 | Gamble |
| 8,331,535 B2 | 12/2012 | Morton |
| 8,451,974 B2 | 5/2013 | Morton |
| 8,552,722 B2 | 10/2013 | Lionheart |
| 8,559,592 B2 | 10/2013 | Betcke |
| 8,625,735 B2 | 1/2014 | Morton |
| 8,804,899 B2 | 8/2014 | Morton |
| 8,824,637 B2 | 9/2014 | Morton |
| 8,837,669 B2 | 9/2014 | Morton |
| 8,842,808 B2 | 9/2014 | Rothschild |
| 8,885,794 B2 | 11/2014 | Morton |
| 8,958,526 B2 | 2/2015 | Morton |
| 8,971,484 B2 | 3/2015 | Beckmann |
| 9,001,973 B2 | 4/2015 | Morton |
| 9,020,095 B2 | 4/2015 | Morton |
| 9,046,465 B2 | 6/2015 | Thompson |
| 9,048,061 B2 | 6/2015 | Morton |
| 9,086,497 B2 | 7/2015 | Bendahan |
| 9,093,187 B1 | 7/2015 | Johnson |
| 9,093,245 B2 | 7/2015 | Morton |
| 9,113,839 B2 | 8/2015 | Morton |
| 9,158,030 B2 | 10/2015 | Morton |
| 9,183,647 B2 | 11/2015 | Morton |
| 9,208,988 B2 | 12/2015 | Morton |
| 9,263,225 B2 | 2/2016 | Morton |
| 9,420,677 B2 | 8/2016 | Morton |
| 9,442,082 B2 | 9/2016 | Morton |
| 9,442,213 B2 | 9/2016 | Bendahan |
| 9,562,866 B2 | 2/2017 | Morton |
| 9,576,766 B2 | 2/2017 | Morton |
| 9,606,259 B2 | 3/2017 | Morton |
| 9,618,648 B2 | 4/2017 | Morton |
| 9,638,646 B2 | 5/2017 | Morton |
| 9,675,306 B2 | 6/2017 | Morton |
| 9,714,920 B2 | 7/2017 | Lionheart |
| 9,726,619 B2 | 8/2017 | Thompson |
| 9,747,705 B2 | 8/2017 | Morton |
| 9,996,890 B1* | 6/2018 | Cinnamon ............ G06V 10/764 |
| 10,107,783 B2 | 10/2018 | Lionheart |
| 10,175,381 B2 | 1/2019 | Morton |
| 10,295,483 B2 | 5/2019 | Morton |
| 10,504,261 B2* | 12/2019 | Cinnamon ............ G06Q 50/265 |
| 10,593,099 B2* | 3/2020 | Sudarsky ................ G06T 15/08 |
| 2001/0022830 A1 | 9/2001 | Sommer |
| 2009/0003514 A1 | 1/2009 | Edic |
| 2009/0034790 A1* | 2/2009 | Song .................... G01V 5/0083 378/10 |
| 2009/0175411 A1* | 7/2009 | Gudmundson ...... G01V 5/0083 378/57 |
| 2009/0213989 A1 | 8/2009 | Harding |
| 2009/0274277 A1 | 11/2009 | Morton |
| 2009/0316855 A1 | 12/2009 | Morton |
| 2010/0172476 A1 | 7/2010 | Morton |
| 2010/0284509 A1 | 11/2010 | Oreper |
| 2012/0219116 A1 | 8/2012 | Thompson |
| 2013/0170611 A1 | 7/2013 | Beckmann |
| 2013/0251098 A1 | 9/2013 | Morton |
| 2013/0264483 A1 | 10/2013 | Abenaim |
| 2013/0336447 A1* | 12/2013 | Morton ................ G01N 24/084 378/57 |
| 2014/0023181 A1 | 1/2014 | Noshi |
| 2014/0211916 A1 | 7/2014 | Morton |
| 2014/0294147 A1 | 10/2014 | Chen |
| 2014/0342631 A1 | 11/2014 | Morton |
| 2015/0357148 A1 | 12/2015 | Morton |
| 2016/0025888 A1* | 1/2016 | Peschmann ............ G01V 5/005 378/57 |
| 2016/0055650 A1* | 2/2016 | Park ...................... G06T 7/0012 382/131 |
| 2016/0343533 A1 | 11/2016 | Morton |
| 2017/0161922 A1 | 6/2017 | Morton |
| 2018/0038988 A1 | 2/2018 | Morton |
| 2018/0128754 A1 | 5/2018 | Thompson |
| 2019/0178821 A1 | 6/2019 | Morton |
| 2019/0323946 A1* | 10/2019 | Myers .................. G01N 23/046 |

OTHER PUBLICATIONS

Swindell, W., Morton, E.J., Evans, P.M. and Lewis, D.G., 1991, "The design of megavoltage projection imaging systems: some theoretical aspects.", Med. Phys.,18(5), 855-866. (Year: 1991).*

Keevil, S.V., Lawinski, C.P. and Morton, E.J., 1987, "Measurement of the performance characteristics of anti-scatter grids.", Phys. Med. Biol., 32(3), 397-403.

Morton, E.J., Webb, S., Bateman, J.E., Clarke, L.J. and Shelton, C.G., 1990, "Three-dimensional x-ray micro-tomography for medical and biological applications ", Phys. Med. Biol., 35(7), 805-820.

Morton, E.J., Swindell, W., Lewis, D.G. and Evans, P.M., 1991, "A linear array scintillation-crystal photodiode detector for megavoltage imaging.", Med. Phys., 18(4), 681-691.

(56) References Cited

OTHER PUBLICATIONS

Morton, E.J., Lewis, D.G. and Swindell, W., 1988, "A method for the assessment of radiotherapy treatment precision", Brit. J. Radiol., Supplement 22, 25.

Swindell, W., Morton, E.J., Evans, P.M. and Lewis, D.G., 1991, "The design of megavoltage projection imaging systems: some theoretical aspects.", Med. Phys., 18(5), 855-866.

Morton, E.J., Evans, P.M., Ferraro, M., Young, E.F. and Swindell, W., 1991, "A video frame store facility for an external beam radiotherapy treatment simulator ", Brit. J. Radiol., 64, 747-750.

Antonuk, L.E., Yorkston, J., Kim, C.W., Huang, W., Morton, E.J., Longo, M.J. and Street, R.A., 1991, "Light response characteristics of amorphous silicon arrays for megavoltage and diagnostic imaging.", Mat. Res. Soc. Sym. Proc., 219, 531-536.

Yorkston, J., Antonuk, L.E., Morton, E.J., Boudry, J., Huang, W., Kim, C.W., Longo, M.J. and Street, R.A., 1991, "The dynamic response of hydrogenated amorphous silicon imaging pixels.", Mat. Res. Soc. Sym. Proc., 219, 173-178.

Evans, P.M., Gildersleve, J.Q., Morton, E.J., Swindell, W., Coles, R., Ferraro, M., Rawlings, C., Xiao, Z.R. and Dyer, J., 1992, "Image comparison techniques for use with megavoltage imaging systems.", Brit. J. Radiol., 65, 701-709.

Morton, E.J., Webb, S., Bateman, J.E., Clarke, L.J. and Shelton, C.G., 1989, "The development of 3D x-ray micro-tomography at sub 100Ã?Äµm resolution with medical, industrial and biological applications.", Presentation at IEE colloquium "Medical scanning and imaging techniques of value in non-destructive testing", London, Nov. 3, 1989.

Antonuk, L.E., Boudry, J., Huang, W., McShan, D.L., Morton, E.J., Yorkston, J, Longo, M.J. and Street, R.A., 1992, "Demonstration of megavoltage and diagnostic x-ray imaging with hydrogenated amorphous silicon arrays.", Med. Phys., 19(6), 1455-1466.

Gildersleve, J.Q., Swindell, W., Evans, P.M., Morton, E.J., Rawlings, C. and Dearnaley, D.P., 1991, "Verification of patient positioning during radiotherapy using an integrated megavoltage imaging system.", in "Tumour Response Monitoring and Treatment Planning", Proceedings of the International Symposium of the W. Vaillant Foundation on Advanced Radiation Therapy, Munich, Germany, Ed A. Breit (Berlin: Springer), 693-695.

Lewis, D.G., Evans, P.M., Morton, E.J., Swindell, W. and Xiao, X.R., 1992, "A megavoltage CT scanner for radiotherapy verification.", Phys. Med. Biol., 37, 1985-1999.

Antonuk, L.E., Boudry, J., Kim, C.W., Longo, M.J., Morton, E.J., Yorkston, J. and Street, R.A., 1991, "Signal, noise and readout considerations in the development of amorphous silicon photodiode arrays for radiotherapy and diagnostic x-ray imaging ", SPIE vol. 1443 Medical Imaging V: Image Physics, 108-119.

Antonuk, L.E., Yorkston, J., Huang, W., Boudry, J., Morton, E.J., Longo, M.J. and Street, R.A., 1992, "Radiation response characteristics of amorphous silicon arrays for megavoltage radiotherapy imaging.", IEEE Trans. Nucl. Sci., 39, 1069-1073.

Antonuk, L.E., Yorkston, J., Huang, W., Boudry, J., Morton, E.J., Longo, M.J. and Street, R.A., 1992, "Factors affecting image quality for megavoltage and diagnostic x-ray a-Si:H imaging arrays.", Mat. Res. Soc. Sym. Proc., 258, 1069-1074.

Antonuk, L.E., Boudry, J., Yorkston, J., Morton, E.J., Huang, W. and Street, R.A., 1992, "Development of thin-film, flat-panel arrays for diagnostic and radiotherapy imaging.", SPIE vol. 1651, Medical Imaging VI: Instrumentation, 94-105.

Yorkston, J., Antonuk, L.E., Seraji, N., Boudry, J., Huang, W., Morton, E.J., and Street, R.A., 1992, "Comparison of computer simulations with measurements from a-Si:H imaging arrays.", Mat. Res. Soc. Sym. Proc., 258, 1163-1168.

Morton, E.J., Antonuk, L.E., Berry, J.E., Boudry, J., Huang, W., Mody, P., Yorkston, J. and Longo, M.J., 1992, "A CAMAC based data acquisition system for flat-panel image array readout", Presentation at IEEE Nuclear Science Symposium, Orlando, Oct. 25-31, 1992.

Antonuk, L.E., Yorkston, J., Huang, W., Boudry, J., Morton, E.J. and Street, R.A., 1993, "Large area, flat-panel a-Si:H arrays for x-ray imaging.", SPIE vol. 1896, Medical Imaging 1993: Physics of Medical Imaging, 18-29.

Morton, E.J., Antonuk, L.E., Berry, J.E., Huang, W., Mody, P. and Yorkston, J., 1994, "A data acquisition system for flat-panel imaging arrays", IEEE Trans. Nucl. Sci., 41(4), 1150-1154.

Antonuk, L.E., Boudry, J., Huang, W., Lam, K.L., Morton, E.J., TenHaken, R.K., Yorkston, J. and Clinthorne, N.H., 1994, "Thin-film, flat-panel, composite imagers for projection and tomographic imaging", IEEE Trans. Med. Im., 13(3), 482-490.

Gildersleve, J., Dearnaley, D., Evans, P., Morton, E.J. and Swindell, W., 1994, "Preliminary clinical performance of a scanning detector for rapid portal imaging", Clin. Oncol., 6, 245-250.

Hess, R., De Antonis, P., Morton, E.J. and Gilboy, W.B., 1994, "Analysis of the pulse shapes obtained from single crystal CdZnTe radiation detectors", Nucl. Inst. Meth., A353, 76-79.

DeAntonis, P., Morton, E.J., T. Menezes, 1996, "Measuring the bulk resistivity of CdZnTe single crystal detectors using a contactless alternating electric field method", Nucl. Inst. Meth., A380, 157-159.

DeAntonis, P., Morton, E.J., Podd, F., 1996, "Infra-red microscopy of CdZnTe radiation detectors revealing their internal electric field structure under bias", IEEE Trans. Nucl. Sci., 43(3), 1487-1490.

Tavora, L.M.N., Morgado, R.E., Estep, R.J., Rawool-Sullivan, M., Gilboy, W.B. and Morton, E.J., 1998, "One-sided imaging of large, dense, objects using the 511 keV photons from induced pair production", IEEE Trans. Nucl. Sci., 45(3), 970-975.

Morton, E.J., 1995, "Archaeological potential of computerised tomography", Presentation at IEE Colloquium on "NDT in archaeology and art", London, May 25, 1995.

Tavora, L.M.N. and Morton, E.J., 1998, "Photon production using a low energy electron expansion of the EGS4 code system ", Nucl. Inst. Meth., B143, 253-271.

Patel, D.C. and Morton, E.J., 1998, "Analysis of improved adiabatic pseudo-domino logic family", Electron. Lett., 34(19), 1829-1830.

Kundu, A and Morton, E.J., 1999, "Numerical simulation of argon-methane gas filled proportional counters", Nucl. Inst. Meth., A422, 286-290.

Luggar, R.D., Key, M.J., Morton, E.J. and Gilboy, W.B., 1999, "Energy dispersive X-ray scatter for measurement of oil/water ratios", Nucl. Inst. Meth., A422, 938-941.

Morton, E.J., Crockett, G.M., Sellin, P.J. and DeAntonis, P., 1999, "The charged particle response of CdZnTe radiation detectors", Nucl. Inst. Meth., A422, 169-172.

Morton, E.J., Clark, R.J. and Crowley, C., 1999, "Factors affecting the spectral resolution of scintillation detectors", Nucl. Inst. Meth., A422, 155-158.

Morton, E.J., Caunt, J.C., Schoop, K., Swinhoe, M., 1996, "A new handheld nuclear material analyser for safeguards purposes", Presentation at INMM annual meeting, Naples, Florida, Jul. 1996.

Hepworth, S., McJury, M., Oldham, M., Morton, E.J. and Doran, S.J., 1999, "Dose mapping of inhomogeneities positioned in radiosensitive polymer gels", Nucl. Inst. Meth., A422, 756-760.

Morton, E.J., Luggar, R.D., Key, M.J., Kundu, A., Tavora, L.M.N. and Gilboy, W.B., 1999, "Development of a high speed X-ray tomography system for multiphase flow imaging", IEEE Trans. Nucl. Sci., 46 III(1), 380-384.

Tavora, L.M.N., Morton, E.J., Santos, F.P. and Dias, T.H.V.T., 2000, "Simulation of X-ray tubes for imaging applications", IEEE Trans. Nucl. Sci., 47, 1493-1497.

Tavora, L.M.N., Morton, E.J. and Gilboy, W.B., 2000, "Design considerations for transmission X-ray tubes operated at diagnostic energies", J. Phys. D: Applied Physics, 33(19), 2497-2507.

Morton, E.J., Hossain, M.A., DeAntonis, P. and Ede, A.M.D., 2001, "Investigation of Au—CdZnTe contacts using photovoltaic measurements", Nucl. Inst. Meth., A458, 558-562.

Ede, A.M.D., Morton, E.J. and DeAntonis, P., 2001, "Thin-film CdTe for imaging detector applications", Nucl. Inst. Meth., A458, 7-11.

Tavora, L.M.N., Morton, E.J. and Gilboy, W.B., 2001, "Enhancing the ratio of fluorescence to bremsstrahlung radiation in X-ray tube spectra", App. Rad. and Isotopes, 54(1), 59-72.

(56) References Cited

OTHER PUBLICATIONS

Menezes, T. and Morton, E.J., 2001, "A preamplifier with digital output for semiconductor detectors", Nucl. Inst. Meth. A., A459, 303-318.

Johnson, D.R., Kyriou, J., Morton, E.J., Clifton, A.C. Fitzgerald, M. and MacSweeney, J.E., 2001, "Radiation protection in interventional radiology", Clin. Rad., 56(2), 99-106.

Tavora, L.M.N., Gilboy, W.B. and Morton, E.J., 2001, "Monte Carlo studies of a novel X-ray tube anode design", Rad. Phys. and Chem., 61, 527-529.

"Morton, E.J., 1998, "Is film dead: the flat plate revolution", Keynote Talk, IPEM Annual Conference, Brighton, Sep. 14-17, 1998"\.

Luggar, R.D., Morton, E.J., Jenneson, P.M. and Key, M.J., 2001, "X-ray tomographic imaging in industrial process control", Rad. Phys. Chem., 61, 785-787.

Luggar, R.D., Morton, E.J., Key, M.J., Jenneson, P.M. and Gilboy, W.B., 1999, "An electronically gated multi-emitter X-ray source for high speed tomography", Presentation at SPIE Annual Meeting, Denver, Jul. 19-23, 1999.

Gregory, P.J., Hutchinson, D.J., Read, D.B., Jenneson, P.M., Gilboy, W.B. and Morton, E.J., 2001, "Non-invasive imaging of roots with high resolution X-ray microtomography", Plant and Soil, 255(1), 351-359.

Kundu, A., Morton, E.J., Key, M.J. and Luggar, R.D., 1999, "Monte Carlo simulations of microgap gas-filled proportional counters", Presentation at SPIE Annual Meeting, Denver, Jul. 19-23, 1999.

Hossain, M.A., Morton, E.J., and Ozsan, M.E., 2002, "Photo-electronic investigation of CdZnTe spectral detectors", IEEE Trans. Nucl. Sci, 49(4), 1960-1964.

Panman, A., Morton, E.J., Kundu, A and Sellin, P.J., 1999, "Optical Monte Carlo transport in scintillators", Presentation at SPIE Annual Meeting, Denver, Jul. 19-23, 1999.

Jenneson, P.M., Gilboy, W.B., Morton, E.J., and Gregory, P.J., 2003, "An X-ray micro-tomography system optimised for low dose study of living organisms", App. Rad. Isotopes, 58, 177-181.

Key, M.J., Morton, E.J., Luggar, R.D. and Kundu, A., 2003, "Gas microstrip detectors for X-ray tomographic flow imaging", Nucl. Inst. Meth., A496, 504-508.

Jenneson, P.M., Luggar, R.D., Morton, E.J., Gundogdu, O, and Tuzun, U, 2004, "Examining nanoparticle assemblies using high spatial resolution X-ray microtomography", J. App. Phys, 96(5), 2889-2894.

Tavora, L.M., Gilboy, W.B. and Morton, E.J., 2000, "Influence of backscattered electrons on X-ray tube output", Presentation at SPIE Annual Meeting, San Diego, Jul. 30-Aug. 3, 2000.

Wadeson, N., Morton, E.J., and Lionheart, W.B., 2010, "Scatter in an uncollimated x-ray CT machine based on a Geant4 Monte Carlo simulation", SPIE Medical Imaging 2010: Physics of Medical Imaging, Feb. 15-18, 2010, San Diego, USA.

Morton, E.J., 2010, "Position sensitive detectors in security: Users perspective", Invited talk, STFC meeting on position sensitive detectors, RAL, May 2010.

Third Party Submission Under 37 CFR 1.290 for U.S. Appl. No. 15/954,853, filed Apr. 19, 2019.

International Search Report for PCT/US18/27872, dated Jul. 23, 2018.

* cited by examiner

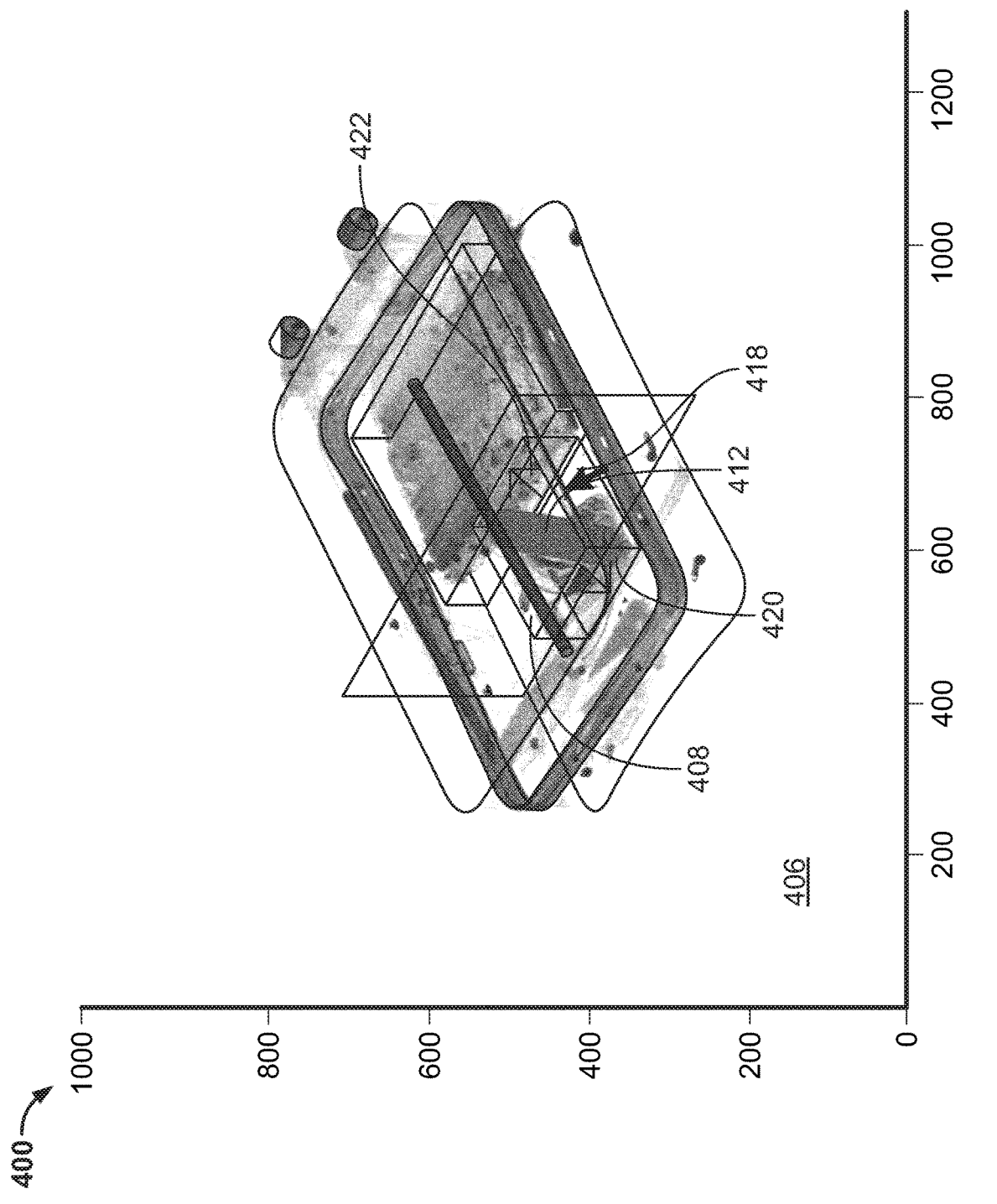

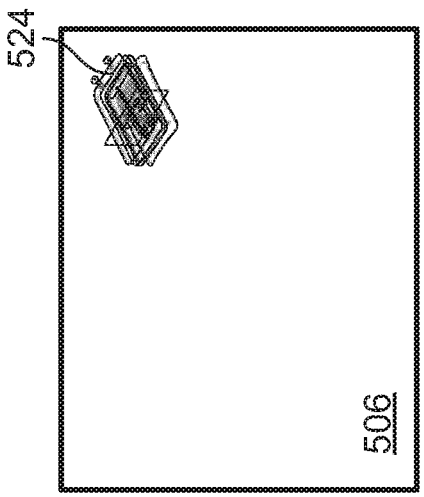
FIG. 5A
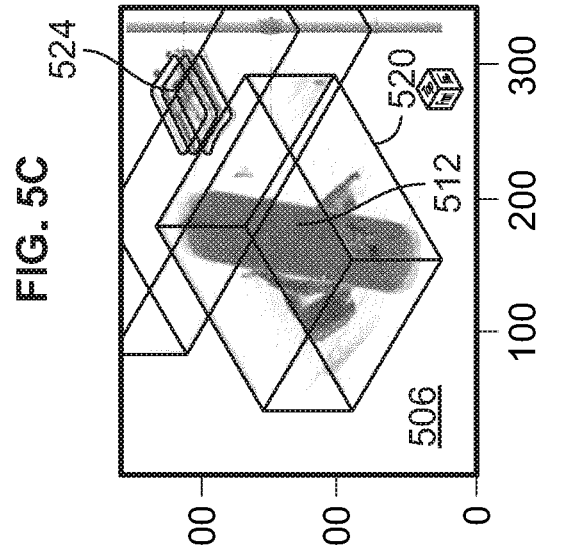
FIG. 5B
FIG. 5C
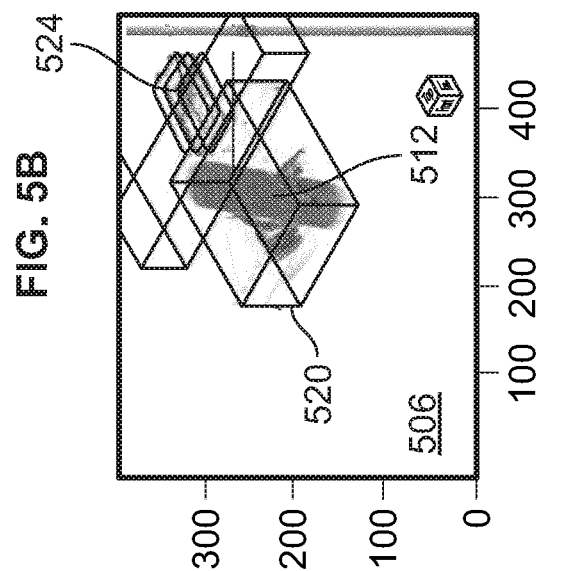
FIG. 5D
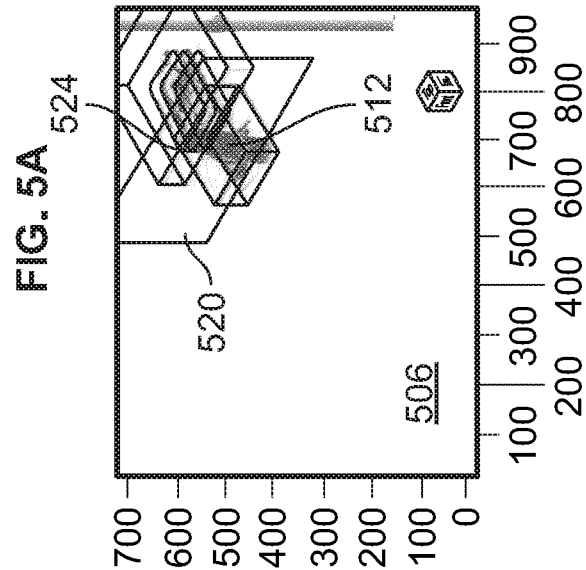
FIG. 5E
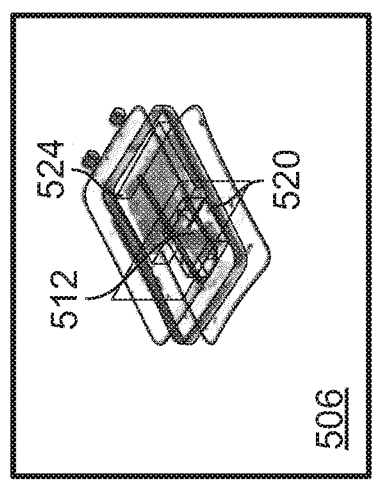
FIG. 5F

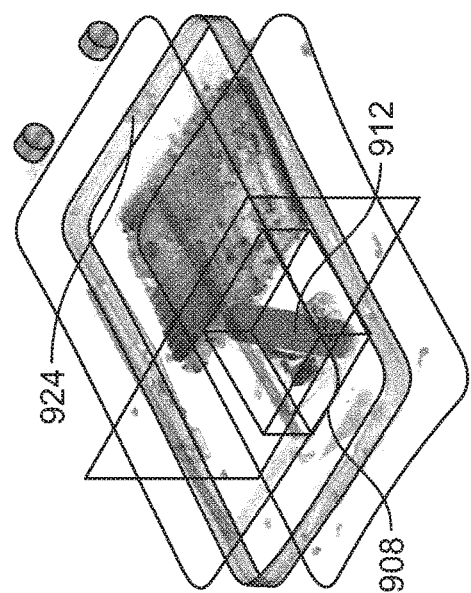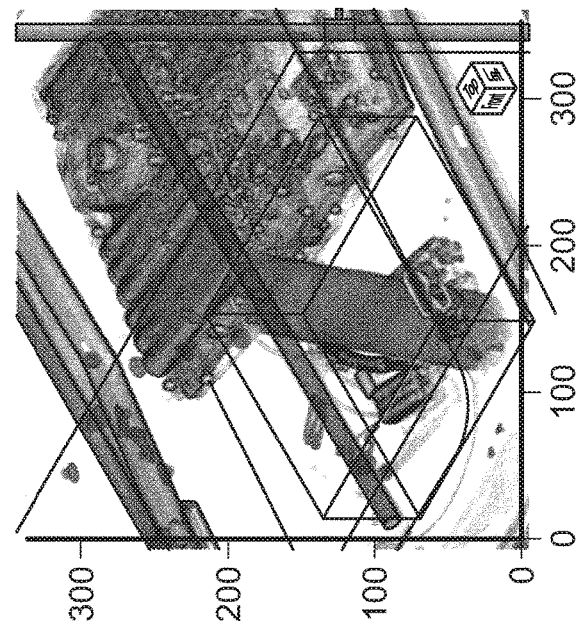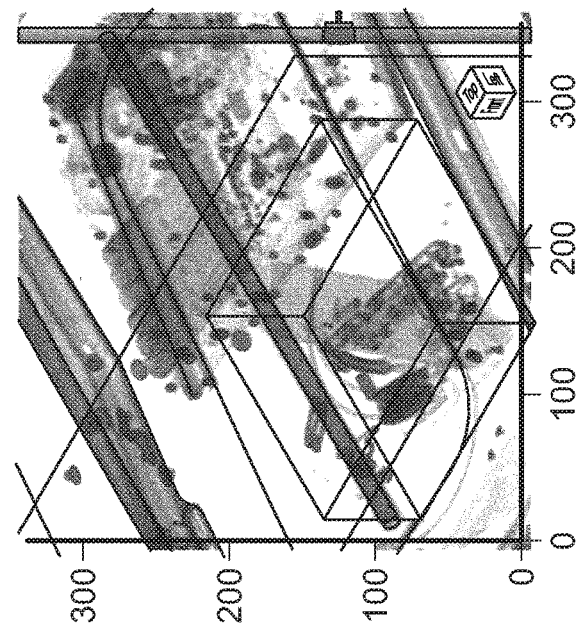

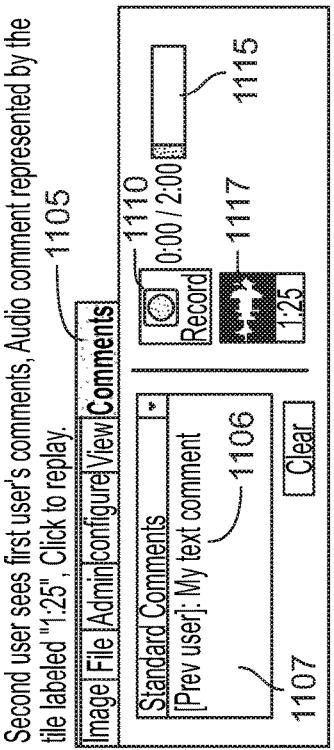

First user enters text comment

FIG. 11A

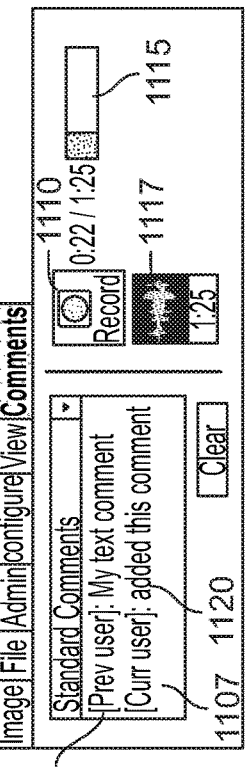

First user records audio comment

FIG. 11B

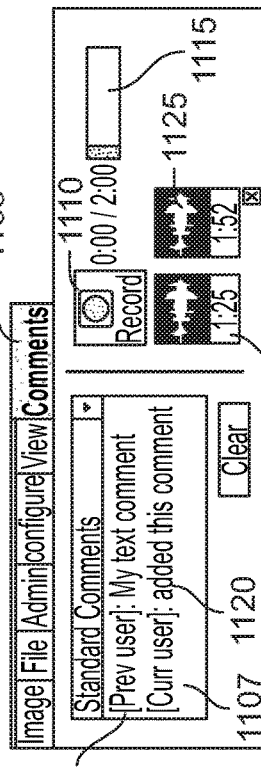

First user finished recording comment. Can delete while bag is still open. Automatically saved on decision

FIG. 11C

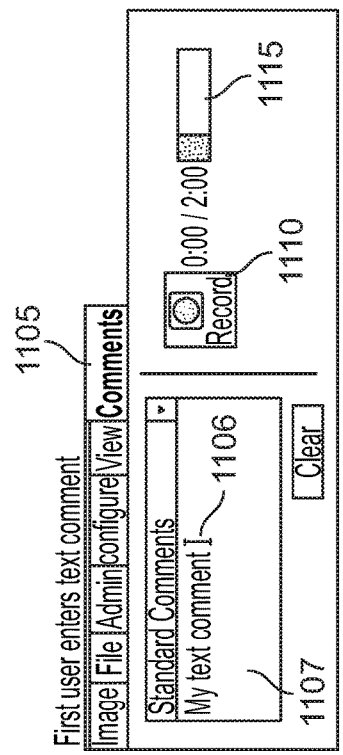

Second user sees first user's comments, Audio comment represented by the tile labeled "1:25". Click to replay.

FIG. 11D

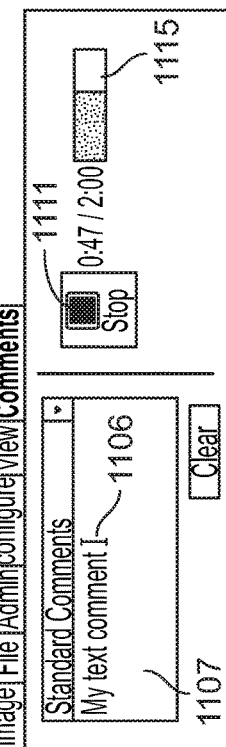

Second user has added a text comment and is listening to first user's audio comment

FIG. 11E

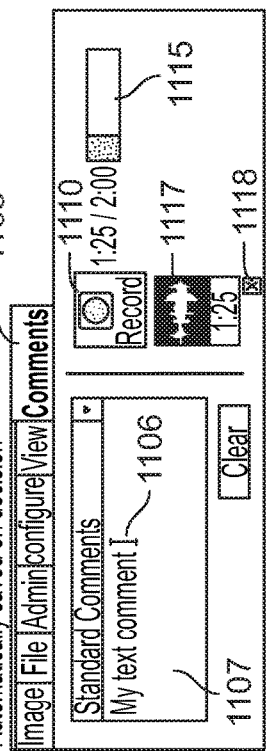

Second user has recorded an audio comment, titled "1:52" (seconds duration)

FIG. 11F

METHODS AND SYSTEMS FOR GENERATING THREE-DIMENSIONAL IMAGES THAT ENABLE IMPROVED VISUALIZATION AND INTERACTION WITH OBJECTS IN THE THREE-DIMENSIONAL IMAGES

CROSS-REFERENCE

The present application relies on, for priority, U.S. Patent Provisional Application No. 62/963,494, entitled "Methods and Systems for Generating Three-Dimensional Images that Enable the Improved Visualization and Interaction with Objects in the Three-Dimensional Image", and filed on Jan. 20, 2020, which is herein incorporated by reference in its entirety.

FIELD

The present specification relates to X-ray scanning systems. More particularly, the present specification relates to X-ray computed tomography inspection systems having improved graphical user interface displays of three-dimensional images that enable improved visualization and interaction with objects in the three-dimensional images.

BACKGROUND

X-ray computed tomography (CT) scanners have been used in security screening in airports for several years. A conventional system comprises an X-ray tube that is rotated about an axis with an arcuate X-ray detector which is also rotated, at the same speed, around the same axis. The conveyor belt on which the baggage is carried is placed within a suitable aperture around the central axis of rotation and moved along the axis as the tube is rotated. A fan beam of X-radiation passes from the source through the object to be inspected and subsequently to the X-ray detector array.

The X-ray detector array records the intensity of X-rays passed through the object to be inspected at several locations along its length. One set of projection data is recorded at each of a number of source angles. From these recorded X-ray intensities, it is possible to form a tomographic (cross-sectional) image, typically by means of a filtered back projection algorithm. In order to produce an accurate tomographic image of an object, such as a bag or package, there is a requirement that the X-ray source pass through every plane through the object. In the arrangement described above, this is achieved by the rotational scanning of the X-ray source, and the longitudinal motion of the conveyor on which the object is carried.

In this type of system the rate at which X-ray tomographic scans can be collected is dependent on the speed of rotation of the gantry that holds the X-ray source and detector array. In a modern CT gantry, the entire tube-detector assembly and gantry will complete two to four revolutions per second. This allows up to four or eight tomographic scans to be collected per second, respectively.

As the state-of-the-art has developed, the single ring of X-ray detectors has been replaced by multiple rings of detectors. This allows many slices (typically 8) to be scanned simultaneously and reconstructed using filtered back projection methods adapted from the single scan machines. With a continuous movement of the conveyor through the imaging system, the source describes a helical scanning motion about the object. This allows a more sophisticated cone-beam image reconstruction method to be applied that can in principle offer a more accurate volume image reconstruction.

Some conventional CT scanners comprise non-rotating stationary gantry systems, which project X-ray beams from fixed, stationary sources at the subjects to be scanned. These systems include one or more spatially distributed X-ray sources for emitting X-rays and one or more X-ray detectors for detecting the X-rays. Multiple X-ray sources are required to be activated at the same time to produce a fan beam of X-rays in order to create a three-dimensional scanned image of an object. Stationary gantry systems may use anywhere from a dozen to a few hundred X-ray sources to produce a scanned image that varies in quality depending on the number of X-ray sources used. Non-rotating gantry CT scanners are also used in medical imaging applications to capture detailed three-dimensional (3D) images of subjects, at high speeds.

Real-time Tomography (RTT) is a new generation of X-ray systems that implement multi-emitter X-ray sources with more than one cathode or electron gun and one or more high voltage anodes within a single vacuum tube, envelope or X-ray tube. In this system, a multi-emitter X-ray source allows non-sequential motion of an X-ray beam about an object under inspection through the use of multiple grid controlled cathodes which can be excited in any chosen sequence, the electron beam from each source being directed to irradiate anode sections which are distributed around the object under inspection. This allows non-helical source trajectories to be constructed at high speeds consistent with the requirements for dynamic and high-throughput object imaging. Additionally, the rapid switching of cathodes under electrostatic control enables a fast movement of the effective focal spot of the X-ray tube and rapid generation of sets of tomographic X-ray scan data without the use of moving parts.

Human visual system has a capability of viewing across a great bandwidth for interpretation of a scene. 3D datasets presented by the current scanning and imaging systems pose a challenge for visualization that has not yet been overcome. The amount of 3D data to be shown all at once in a single view is limited. Objects of interest are often hidden within the data and occluded. Visualization of CT data of a large bag in airport screening contains one or more regions of interest (ROI) that may be potential threat objects (PTOs), occluded by surrounding clutter in a baggage that is being scanned. These ROIs often cannot be discriminated from occluding regions. Simply extracting the ROIs or PTOs from the image may not be helpful because one typically loses context upon isolating the ROI or PTOs. Visualization of small ROIs without surrounding information is often meaningless. Surrounding context is particularly important when visualizing an object within a 3D scene because humans comprehend objects and spatial relationships between objects based on depth cues. In order for the user to correctly interpret the PTO (the focus), interact with it or orient oneself, the user simultaneously needs a detailed depiction (focus) along with a general overview (context).

While CT X-ray scanners are able to produce 3D images of objects under inspection and/or of medical subjects, they are limited in their ability to process complex 3D images and portions thereof, for a relatively more focused and contextual analysis—to resolve security threats and, of the regions of interest in medical applications. Therefore, there is a need for improving efficiency and usability of the analysis of threat objects and/or anatomical structures embedded in a complex 3D image.

SUMMARY

The following embodiments and aspects thereof are described and illustrated in conjunction with systems, tools and methods, which are meant to be exemplary and illustrative, and not limiting in scope. The present application discloses numerous embodiments.

In some embodiments, the present specification discloses a method of scanning an object using an X-ray scanner having a scanning volume, comprising: transporting the object through the scanning volume using a conveyor; irradiating the object with X-rays generated by a plurality of X-ray sources arranged around the scanning volume; detecting X-rays transmitted through the object using a detector array positioned between the X-ray source and the scanning volume, wherein the detector array has a plurality of multi-energy detector modules arranged around the scanning volume; analyzing reconstructed image data of the object being inspected to identify a potential threat object within the object by classifying the potential threat object, wherein the classifying comprises identifying voxels of the potential threat object in the voxels of the image of the object; and displaying the reconstructed image data as an image on a display, wherein the displaying comprises isolating the potential threat object with spatial and contextual information relative to the object.

Optionally, the classifying comprises visually highlighting the voxels of the potential threat object within a visually perceptible bounding box in the image.

Optionally, the classifying comprises visually highlighting the voxels of the potential threat object with optical properties that are different from optical properties of remaining voxels of the object in the image.

Optionally, the optical properties comprise illuminating the potential threat object with a color that is different from the remaining voxels of the object in the image, edge highlighting, or sampling.

Optionally, the highlighting with optical properties comprises illuminating the potential threat object with an opacity that is different from the remaining voxels of the object in the image.

Optionally, the plurality of X-ray sources are contained in a multi-focus X-ray source arranged around the scanning volume.

Optionally, the plurality of X-ray sources are a plurality of X-ray source points in the multi-focus X-ray source.

Optionally, the analyzing comprises animating the image of the object and the potential threat object.

Optionally, the isolating the potential threat object comprises magnifying the image of the potential threat object.

Optionally, the isolating comprises removing portions of the reconstructed image data that occlude a view of the potential threat object by, at least one of, executing a view dependent virtual cut-away or rendering occluding portions of the reconstructed image data as transparent.

Optionally, the method further comprises displaying the image of the potential threat object in a foreground by moving a visual position of the potential threat object from a first position on the display on to a second position on the display, wherein the second position appears closer to a viewer on the display relative to the first position.

Optionally, isolating the potential threat object comprises diminishing a remainder of the image after visually highlighting the potential threat object.

Optionally, the method further comprises displaying a portion of the image that is not the potential threat object in a background by moving a visual position of the portion of the image that is not the potential threat object on the display on to a second position on the display, wherein the second position appears farther away to a viewer on the display relative to the first position.

Optionally, the method further comprises displaying the portion of the image that is not the potential threat object in a thumbnail on the display.

Optionally, the method further comprises displaying the portion of the image that is not the potential threat object in a corner of a display.

Optionally, the analyzing comprises enabling a user to interact with the reconstructed image data for at least one of classifying and isolating the image of the potential threat object with spatial and contextual information relative to the image of the object.

Optionally, the analyzing comprises enabling a user to interact with the reconstructed image data by receiving a first physical touch or clicking on the mouse of an area of a display that depicts a portion of the reconstructed image data and, in response to the first physical touch, visually isolating said portion of the reconstructed image data from a remainder of the portion of the reconstructed image data.

Optionally, the visual isolating comprises replacing the portion of the reconstructed image data with a transparent void having dimensions equivalent to the portion of the reconstructed image data.

Optionally, the visual isolating comprises modifying a visual scale of the portion of the reconstructed image data to make the visual presentation of the portion of the reconstructed image data visually larger than the portion of the reconstructed image data prior to the first physical touch.

Optionally, a plurality of guide lines maintain spatial and contextual comprehension between said visually isolated portion and said remainder of the reconstructed image data of the object.

Optionally, a scale is provided along the isolated object to indicate the physical measurement of the object Optionally, in response to a second physical touch of the area of the display that depicts the portion of the reconstructed image data, the method further comprises visually placing the portion of the reconstructed image data back into the thumbnail such that it is in the same visual configuration as shown prior to the first physical touch.

Optionally, the method further comprises enabling the user to interactively define any portion of the visually displayed reconstructed image data and select any portion of the visually displayed reconstructed image data to be isolated such that the potential threat object is in the foreground and a remainder of the image is visually positioned in a corner of the display as a thumbnail.

Optionally, the display comprises a touch screen and the interactive identification is enabled by touch operations on the touch screen.

In some embodiments, the present specification discloses a method of enabling at least first and second operators to consecutively associate audio comments with a scan image of an object, the method comprising: viewing, by said first operator, said scan image on a graphical interface, wherein said graphical interface includes an audio button; activating, by said first operator, said audio button to begin recording audio comments with reference to said scan image while simultaneously reviewing and maneuvering said scan image in said graphical interface; deactivating, by said first operator, said audio button to generate a first audio file of said audio comments of said first operator, save said first audio file in association with said scan image and display a first icon on said graphical interface, wherein said first icon is indicative of said first audio file, wherein said first audio file is associated with an identification of said first operator, and wherein said first audio file has an associated date and time of recording by said first operator; viewing, by said second operator, said scan image on said graphical interface, wherein said graphical interface includes said audio button and said first icon; activating, by said second operator, said first icon to enable said second operator to listen to said first audio file while simultaneously reviewing and maneuvering said scan image in said graphical interface; activating, by said second operator, said audio button to begin recording audio comments with reference to said scan image while simultaneously continuing to review and maneuver said scan image in said graphical interface; and deactivating, by said second operator, said audio button to generate a second audio file of said audio comments of said second operator, save said second audio file in association with said scan image and display a second icon on said graphical interface, wherein said second icon is indicative of said second audio file, wherein said second audio file is associated with an identification of said second operator, and wherein said second audio file has an associated date and time of recording by said second operator.

In some embodiments, the present specification discloses a method of reviewing a scan image of an object, the method comprising: presenting, to an operator, said scan image on a graphical interface, wherein a plurality of voxels in said scan image are highlighted in at least one mask, said plurality of voxels being indicative of at least one potential threat item, wherein said at least one mask has a first intensity of color of said mask, and wherein said graphical interface has an actuator to enable modulation of said first intensity to a plurality of intensities between a maximum and a minimum intensity; manipulating, by said operator, said actuator to modulate said first intensity to a second intensity of the color of said mask, wherein said second intensity is less than said first intensity; further manipulating, by said operator, said actuator to modulate said second intensity to a third intensity of the color of said mask, wherein said third intensity is less than said second intensity; and further manipulating, by said operator, said actuator to modulate said third intensity to said first intensity of the color of said mask.

Optionally, said first intensity is representative of a least level of transparency of the color of said mask. Optionally, said third intensity is representative of a highest level of transparency of the color of said mask. Optionally, at said second intensity, a visibility of said at least one potential threat item increases compared to a visibility of said at least one potential threat item at said first intensity.

The aforementioned and other embodiments of the present specification shall be described in greater depth in the drawings and detailed description provided below.

BRIEF DESCRIPTION OF THE DRAWINGS

These and other features and advantages of the present invention will be further appreciated, as they become better understood by reference to the detailed description when considered in connection with the accompanying drawings:

FIG. 4A illustrates an exemplary step in the process of isolating image of a PTO in a 3D view within a display, in accordance with some embodiments of the present specification;

FIG. 5A illustrates a first step in an exemplary sequence of steps that provide an isolated display of a PTO in a 3D display, while retaining spatial and contextual information of the PTO relative to a baggage, in accordance with some embodiments of the present specification;

FIG. 5B illustrates a second step in an exemplary sequence of steps that provide an isolated display of a PTO in a 3D display, while retaining spatial and contextual information of the PTO relative to a baggage, in accordance with some embodiments of the present specification;

FIG. 5C illustrates a third step in an exemplary sequence of steps that provide an isolated display of a PTO in a 3D display, while retaining spatial and contextual information of the PTO relative to a baggage, in accordance with some embodiments of the present specification;

FIG. 5D illustrates a fourth step in an exemplary sequence of steps that provide an isolated display of a PTO in a 3D display, while retaining spatial and contextual information of the PTO relative to a baggage, in accordance with some embodiments of the present specification;

FIG. 5E illustrates a fifth step in an exemplary sequence of steps that provide an isolated display of a PTO in a 3D display, while retaining spatial and contextual information of the PTO relative to a baggage, in accordance with some embodiments of the present specification;

FIG. 5F illustrates a sixth step in an exemplary sequence of steps that provide an isolated display of a PTO in a 3D display, while retaining spatial and contextual information of the PTO relative to a baggage, in accordance with some embodiments of the present specification;

FIG. 9A illustrates a focus including a PTO within a region of interest bound by a box inside a context of a baggage, in accordance with some embodiments of the present specification;

FIG. 9B illustrates edge highlighting of the objects within the region of interest in the box, in accordance with some embodiments of the present specification;

FIG. 9C illustrates voxels within the box that includes the focus, shaded and rendered with different optical properties, lambertian shading, ambience, and with edge highlighting, in accordance with some embodiments of the present specification;

FIG. 11A illustrates a first step in a method for enabling at least two security screeners to record audio comments related to a scan image of a bag, in accordance with some embodiments of the present specification;

FIG. 11B illustrates a second step in a method for enabling the at least two security screeners to record audio comments related to the scan image of the bag, in accordance with some embodiments of the present specification;

FIG. 11C illustrates a third step in a method for enabling the at least two security screeners to record audio comments related to the scan image of the bag, in accordance with some embodiments of the present specification;

FIG. 11D illustrates a fourth step in a method for enabling the at least two security screeners to record audio comments related to the scan image of the bag, in accordance with some embodiments of the present specification;

FIG. 11E illustrates a fifth step in a method for enabling the at least two security screeners to record audio comments related to the scan image of the bag, in accordance with some embodiments of the present specification;

FIG. 11F illustrates a sixth step in a method for enabling the at least two security screeners to record audio comments related to the scan image of the bag, in accordance with some embodiments of the present specification;

DETAILED DESCRIPTION

Figure 1:
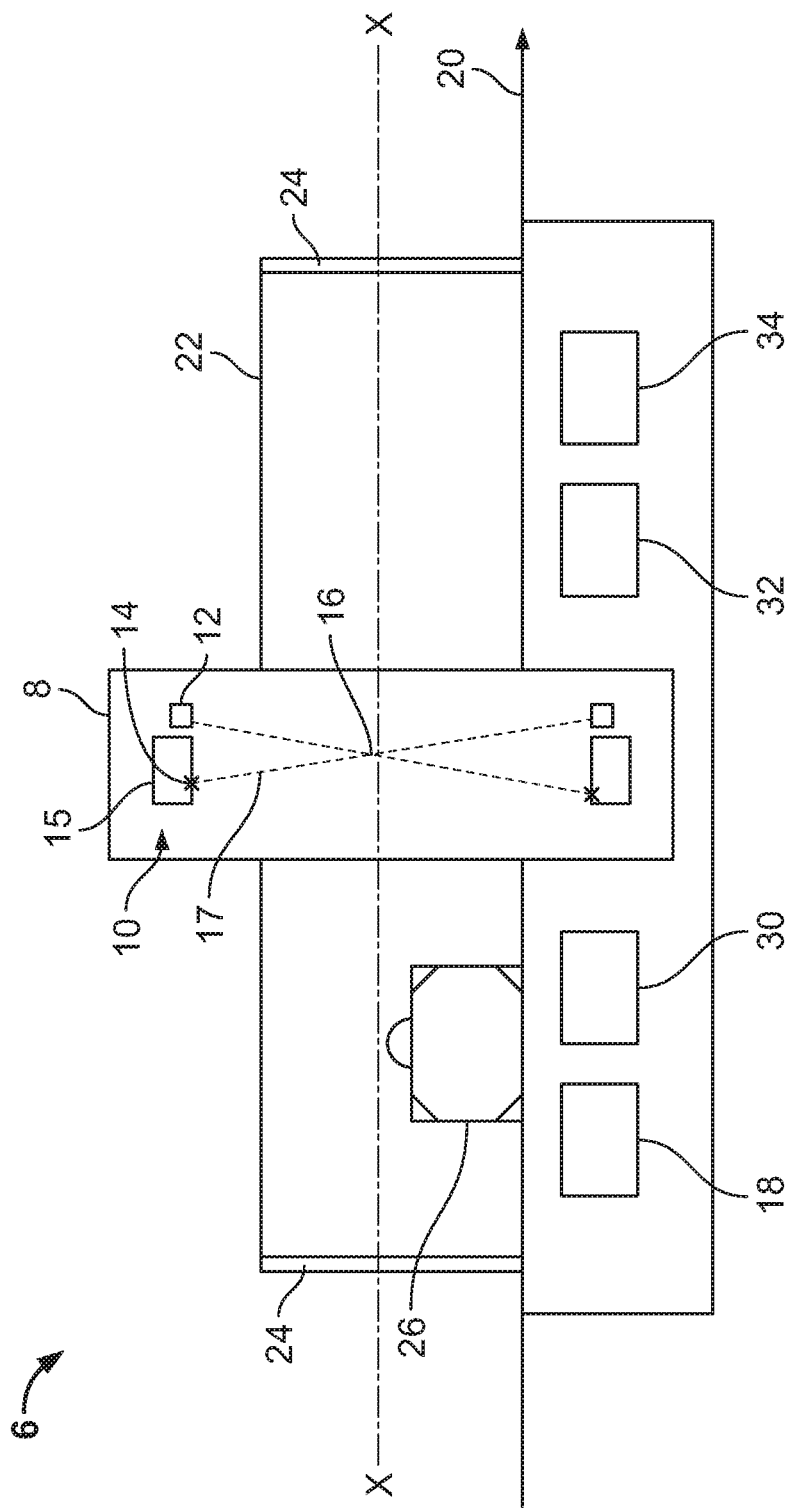
FIG. 1 is a longitudinal schematic view of a real time tomography security scanning system having a circular locus of source points, produced by conventional systems.

Embodiments of the present specification provide methods and systems for efficiently visualizing and interacting with, and therefore isolating Potential Threat Objects (hereinafter, referred to as a "PTO") within baggage along with its surrounding spatial and contextual information. An imaging system, such as a stationary CT scanner or a rotating CT scanner, is provided with an object, such as baggage, or a medical subject and generates a three-dimensional image defined by a plurality of voxels. In embodiments, semantic information, such as including and not limited to semantic classification and a bounding box, of a PTO within the scan of the baggage or of a region of interest within the scan of an anatomical structure of the medical subject are identified and provided to the system. A context of the PTO or the region of interest is provided by volume-rendering the image of the whole baggage or the anatomical structure, while the PTO or the region of interest is displayed in a focus region.

In embodiments, the system enables a user to interactively select a PTO or a region of interest from the scan, by clicking on it from the display or otherwise interacting with the scan to select the image of the PTO or the region of interest. In alternative methods of interaction, the user may touch the image of the PTO or the region of interest on a touch screen, so as to select the image of the PTO or the region of interest. It should be noted herein that any object may be extracted and manipulated from the scan, and that the selection is not limited to the image of the PTO or region of interest. In further alternative embodiments for methods of interaction, a user may employ methods of eye-tracking and dwell. In still further alternative embodiments, a user may employ various augmented reality techniques, including "pull and grab". In embodiments, the user's selection brings the PTO (or the region of interest) and/or the focus region into foreground, while the whole baggage (or the anatomical structure) providing a spatial and contextual background for the PTO (or the region of interest), fades into a corner of the display. The user may further interact with the selected image of the PTO or the region of interest including by rotating the image to view it from different angles and perspectives. In embodiments, rotating the selected PTO image or region of interest image simultaneously rotates contextual image of the whole baggage. In some embodiments, the contextual background is rendered with the image of the selected PTO or the extracted region of interest, so as to indicate that the PTO or the region of interest has been brought into the foreground.

In some embodiments, the system and method of the present specification highlight one or more focus regions by rendering them with different optical properties and different light transport parameters such as including and not limited to a different transfer function, increased ray sampling density during ray casting, and accentuated edge highlighting with gradient opacity transfer functions. Additionally, within the PTO bounding box, voxels that are classified as threats are highlighted with different optical properties, such that it stands out from the rendering of the contextual background.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

It should be noted herein that while the embodiments have been explained with reference to a non-rotating or stationary gantry CT scanner, the methods of the present specification can also be used in rotating gantry CT scanners. While various embodiments have been explained with reference to identifying a PTO (Potential Threat Object), it should be appreciated that the embodiments are not limited to threat objects and that the embodiments of the present specification are equally applicable to identifying regions/areas of interest in anatomical structures in medical subjects for diagnostic purposes as well as in conjunction with industrial applications.

It should be further noted herein that while some embodiments are explained with reference to a particular CT scanner system having a rectangular tunnel geometry, the methods of the present specification are not limited to such embodiments. Some embodiments of the present specification are explained with reference to a CT scanner and persons skilled in the art will appreciate that the various embodiments can be used in different types of scanners, provided they generate three dimensional images defined by a plurality of voxels.

In embodiments of the specification, the term "extracted" is defined as visually isolating or separating a region from the remainder of the image. In an embodiment, for example, extraction is accompanied by a modification of the remainder of the image to visually compensate for the absence of the extracted region by a) shrinking the area (in the remainder of the image) from which the extracted region was removed, b) coloring the area (in the remainder of the image) a different color relative to the image before extraction, c) blacking out the area (in the remainder of the image) relative to the image before extraction, d) whiting out the area (in the remainder of the image) relative to the image before extraction or e) overlaying a pattern (such as cross hatch) in the area (in the remainder of the image) relative to the image before extraction.

FIG. 1 illustrates a conventional inspection system having a circular locus of source points. Referring to FIG. 1, a concourse baggage scanning system 6 comprises a scanning unit 8 which includes a multi-focus X-ray source 10 and X-ray detector array 12. The source 10 comprises a large number of source points 14 positioned in respective, spaced locations on the source, and arranged in a full 360 degree circular array about the X-X axis of the system (which is parallel to the conveyor belt 20). It will be appreciated that curved arrays covering less than the full 360 degree angle can also be used. The source 10 can be controlled to produce X-rays from each of the source points 14 in each of the source units individually whereby X-rays from each source point 14 are directed inwards through the scanning region 16 within the circular source 10. The source 10 is controlled by a control unit 18 which controls the applied electrical potentials (to the grid wires) and hence controls the emission of X-rays from each of the source points 14.

The multi-focus X-ray source 10 allows the electronic control circuit 18 to be used to select which of the many individual X-ray source points 14 within the multi-focus X-ray source is active at any moment in time. Hence, by electronically scanning the multi-focus X-ray tube, X-ray source virtual "motion" is created with no actual physical movement of mechanical parts. In this case, the angular velocity of source rotation can be increased to levels that simply cannot be achieved when using conventional rotating X-ray tube assemblies. This rapid rotational scanning translates into an equivalently speeded up data acquisition process and, as a result, fast image reconstruction.

The detector array 12 is also circular and arranged around the axis X-X in a position that is slightly offset in the axial direction from the source 10. The source 10 is arranged to direct the X-rays it produces through the scanning region 16 towards the detector array 12 on the opposite side of the scanning region. The paths 17 of the X-ray beams therefore pass through the scanning region 16 in a direction that is substantially, or almost, perpendicular to the scanner axis X-X, crossing each other near to the axis. The volume of the scanning region that is scanned and imaged is therefore in the form of a thin slice perpendicular to the scanner axis X-X. The source is scanned so that each source point emits X-rays for a respective period, the emitting periods being arranged in a predetermined order. As each source point 14 emits X-rays, the signals from the detectors 12, which are dependent on the intensity of the X-rays incident on the detector, are produced, and the intensity data that the signals provide are recorded in a memory. When the source has completed its scan the detector signals can be processed to form an image of the scanned volume.

A conveyor belt 20 moves through the imaging volume, from left to right, as seen in FIG. 1, parallel to the axis X-X of the scanner. X-ray scatter shields 22 are located around the conveyor belt 20 upstream and downstream of the main X-ray system to prevent operator dose due to scattered X-rays. The X-ray scatter shields 22 include lead rubber strip curtains 24 at the open ends of the system such that the item 26 under inspection is conveyed through one curtain on entering the inspection region and another curtain upon leaving the inspection region. In the integrated system shown, the main electronic control system 18, a processing system 30, a power supply 32 and cooling racks 34 are shown mounted underneath the conveyor 20. The conveyor 20 is arranged to be operated normally with a continuous scanning movement at constant conveyor speed, and typically has a carbon-fiber frame assembly within the imaging volume.

It should be noted that the systems described throughout this specification comprise at least one processor (such as processing system 30) to control the operation of the system and its components. It should further be appreciated that the at least one processor is capable of processing programmatic instructions, has a memory capable of storing programmatic instructions, and employs software comprised of a plurality of programmatic instructions for performing the processes described herein. In one embodiment, the at least one processor is a computing device capable of receiving, executing, and transmitting a plurality of programmatic instructions stored on a volatile or non-volatile computer readable medium.

Figure 2A:
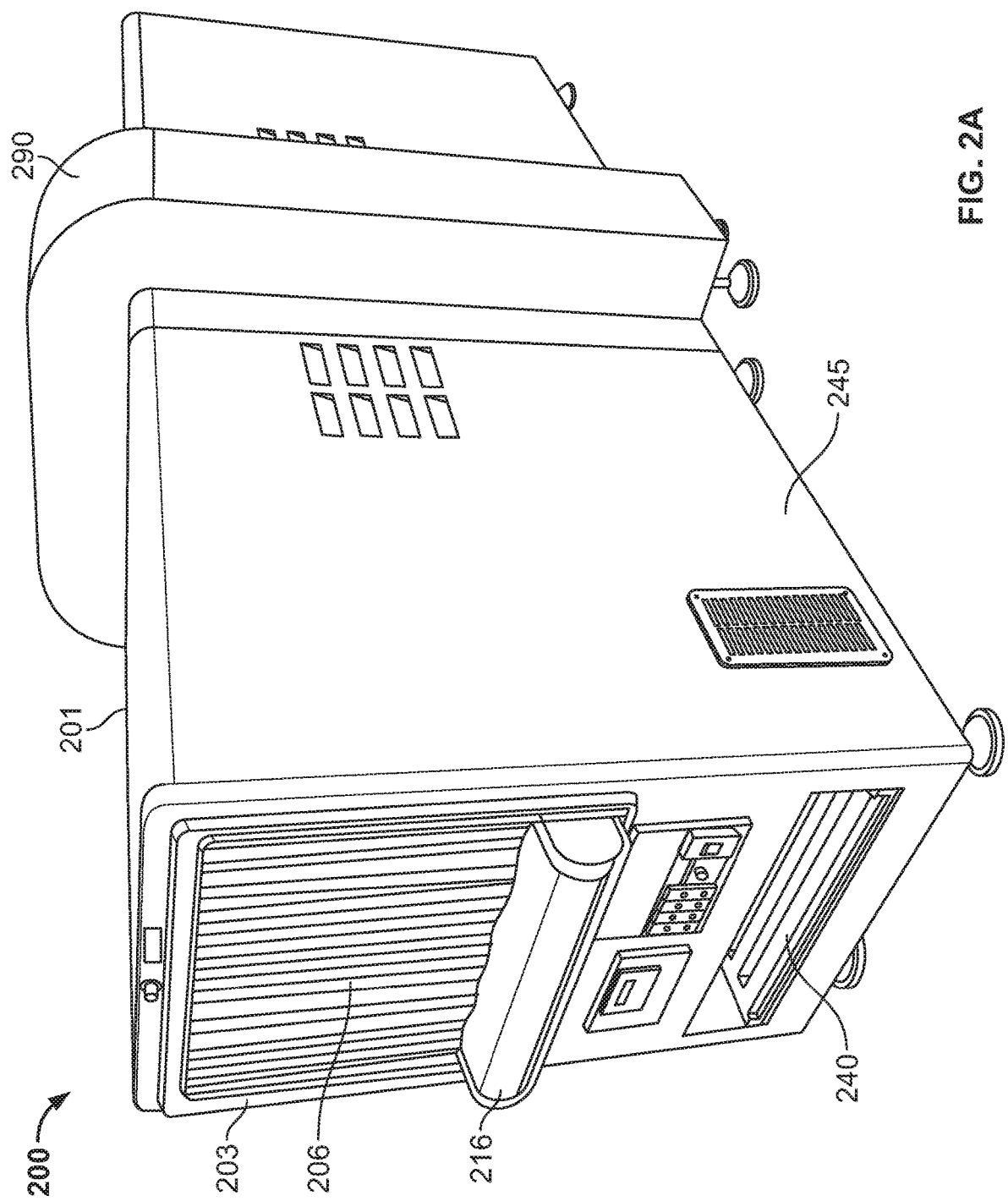
FIG. 2A is a perspective view of a scanning unit, in accordance with an embodiment of the present specification.

In accordance with an embodiment of the present specification, FIG. 2A is a perspective view of a scanning unit 200, shown from a first side 245, comprising a substantially rectangular housing/enclosure 201 for housing a plurality of X-ray source points and detectors. It should be appreciated that, in alternate embodiments, the housing 201 may have a quadrilateral shape, such as, but not limited to, a square. An object under inspection is conveyed through a first open end or scanning aperture 203, enters an inspection region 206, and exits through a second open end (opposite to the first open end 203). In accordance with an embodiment, both feed and return conveyor loops pass through a space 216 just below the inspection region 206, while space or compartment 240 is reserved in the base of the scanning system (approximately 200 mm deep) to accommodate automated return of trays when integrated with an automatic tray return handling system. The scanning unit 200 has an external body comprising the components stated above within said body. In embodiments, the body of unit 200 is shaped similar to a large elongated right rectangular prism, or a rectangular cuboid with curved corners. In some embodiments, the unit 200 is an extension of the shape of housing/enclosure 201. In embodiments, the inspection region 206 positioned within housing 201 is shaped similar to housing 201. In some embodiments, a narrow projection 290 encompasses three external surfaces of the unit 200.

Figure 2B:
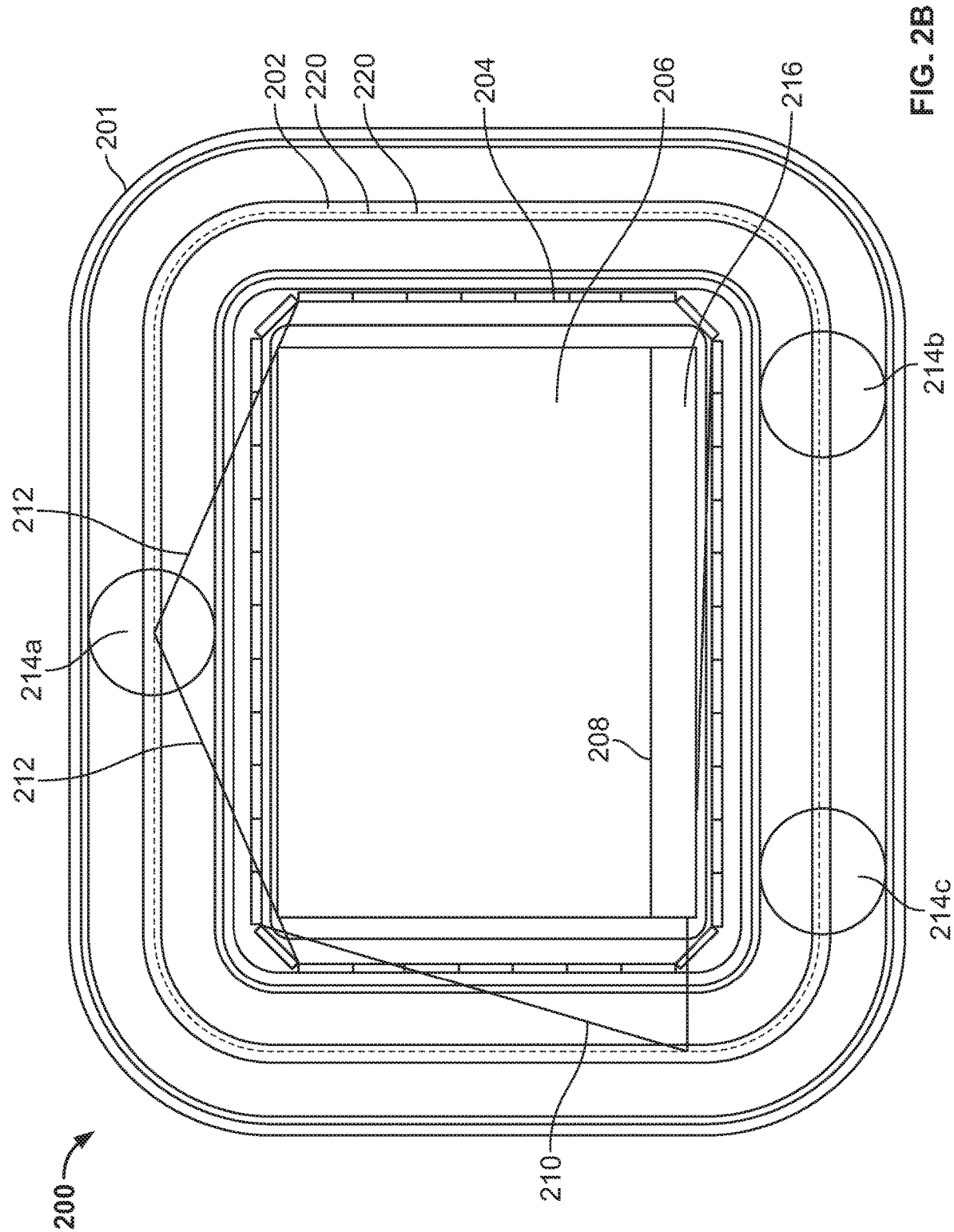
FIG. 2B is a cross-sectional view of a housing/enclosure of the scanning unit of FIG. 2A, comprising a plurality of X-ray sources points and detectors, arranged in a substantially rectangular shape around a scanning volume, in accordance with an embodiment of the present specification.

FIG. 2B illustrates a cross-sectional view of the housing 201 of a scanning unit 200, comprising a plurality of X-ray source points and detectors arranged in a substantially rectangular shape around a scanning volume, in accordance with first and second embodiments of the present specification. In various embodiments, the rectangular housing 201 has width ranging from 800 mm to 1400 mm and a height ranging from 600 mm to 1500 mm. In various embodiments, the housing 201 is configured to define an imaging volume or inspection tunnel 206, which is also rectangular, that has a width ranging from 500 mm to 1050 mm and a height ranging from 300 mm to 1050 mm. It should be appreciated that, in alternate embodiments, the plurality of X-ray source points and detectors can be arranged in other quadrilateral shapes, such as, but not limited to, a square shape. It should be appreciated that the rectangular, quadrilateral, or square shape may also have rounded edges and encompasses shapes known as rounded rectangles, squircles, or rectellipses.

The scanning unit 200 comprises a multi-focus X-ray source 202 and X-ray detector array 204 enclosed within housing 201. The source 202 comprises a large number of source points (or, in an embodiment, electron guns 220) in locations spaced about the source 202, and arranged in a substantially non-circular, such as rectangular, geometry around an imaging or inspection volume 206, in accordance with an embodiment. In embodiments, the X-ray detector array 204 is positioned between the X-ray source points 220 and the imaging volume 206 such that the source points 220 and the detector array 204 surround the imaging volume 206.

A conveyor belt 208 carries objects/luggage to be inspected through the imaging volume 206 along a longitudinal axis of the scanning unit 200. In an embodiment, the conveyor belt 208 has a speed of 0.5 m/s which is about twice the speed of conventional X-ray systems that typically operate at a speed of about 0.25 m/s and is about three times the speed of conventional rotating gantry systems that typically operate at a speed of about 0.15 m/s. In various embodiments, the conveyor belt 208 has a speed ranging from 0.1 m/s to 1.0 m/s. Both feed and return conveyor loops pass through the base 216 of the imaging volume 206, having a depth of approximately 50 mm while space 240 (approximately 200 mm deep and having a width equal to that of the base 216 of the imaging volume 206) is reserved in the base of the scanning unit 200, to accommodate automated return of trays when integrated with an automatic tray return handling system, in accordance with some embodiments. The conveyor and feed return loops both pass through base 216 of imaging volume 206. In contrast, trays that have been conveyed through the inspection or imaging volume 206 by the conveyor 208 are returned back through region 240, which ranges from 100 mm to 300 mm deep and is preferably 200 mm deep.

In various embodiments, the rectangular housing 201 has width ranging from 800 mm to 1400 mm and a height ranging from 600 mm to 1500 mm. In embodiments, the housing 201 has a maximum width of 920 mm and a maximum height of 720 mm. In various embodiments, the housing 201 is configured to define an imaging volume or inspection tunnel 206, which is also rectangular, that has a width ranging from 500 mm to 1050 mm and a height ranging from 300 mm to 1050 mm. In some embodiments, the housing 201 is configured to define an imaging volume or inspection tunnel 206 that is approximately 620 mm in width and approximately 420 mm in height.

In an embodiment, as shown in FIG. 2B, X-ray source 202 comprises 256 electron guns 220, grouped in units of 16, substantially equidistantly spaced around the imaging volume 206 on a 12 mm pitch (that is, a center-to-center spacing between adjacent electron guns is 12 mm). In various embodiments, the X-ray source 202 comprises 64 to 2048 electron guns grouped in 4 to 32 units of electron guns. In various embodiments, the electron guns 220 are spaced on a pitch ranging from 10 mm to 14 mm. In this configuration, every emission source point has a different field of view (FOV). In various embodiments, the X-ray sources emit fan beams which have different beam angles based on the location of the X-ray source points with respect to the imaging volume.

As shown in FIG. 2B, a plurality of support means 214a, 214b, and 214c, positioned at points along the periphery of the imaging volume 206, are provided for supporting the X-ray source 202. In an embodiment, the support means 214b and 214c are also used to provide coolant and power to the X-ray source 202 and the scanning system 200, respectively.

While FIGS. 1, 2A, and 2B describe non-rotating CT scanning systems, embodiments of the present specification are applicable to rotating CT scanners and other types of X-ray scanning and imaging systems.

Figure 3:
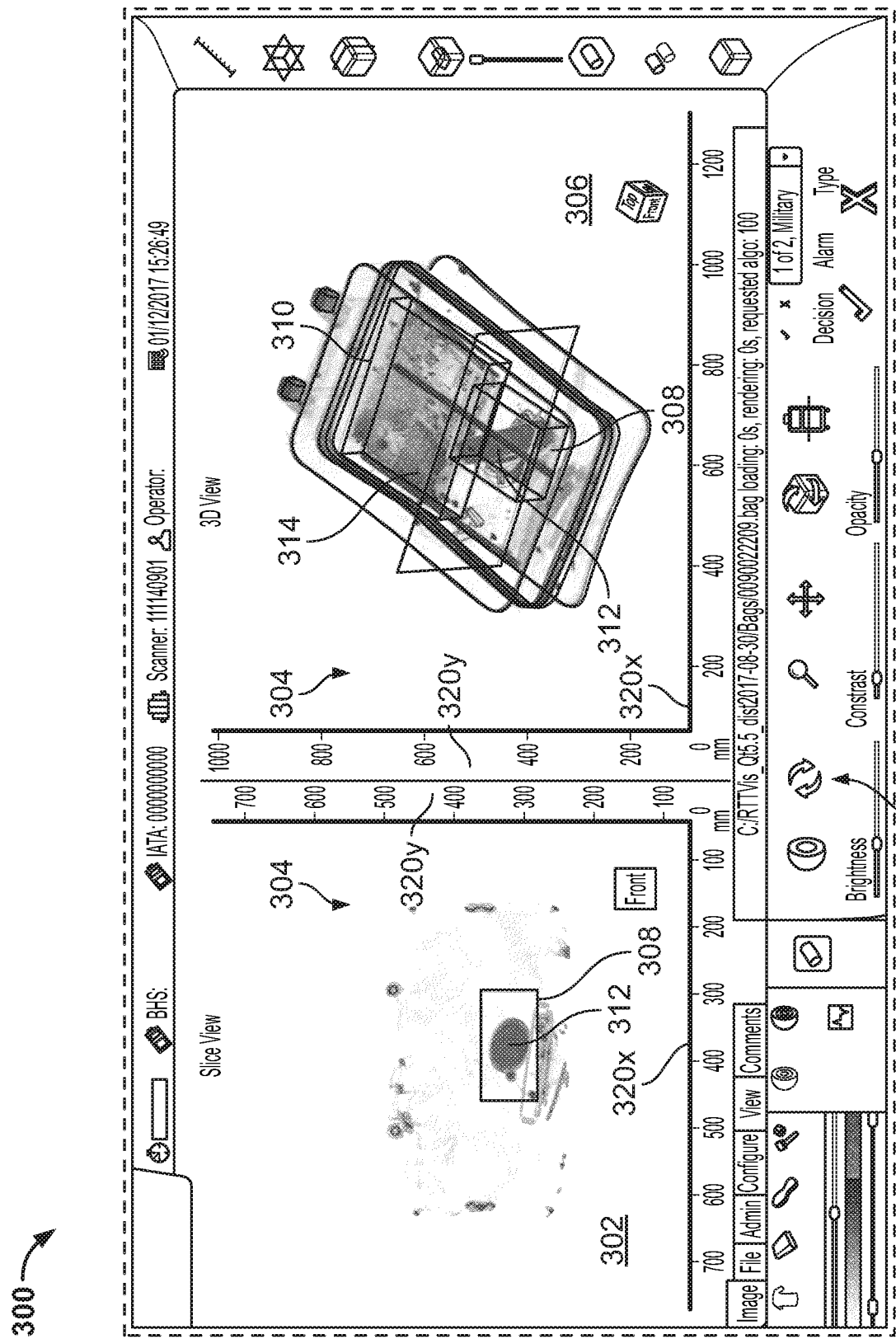
FIG. 3 illustrates an exemplary image of a scanned object and a potential threat object (PTO) within the object, in accordance with some embodiments of the present specification.

FIG. 3 illustrates an exemplary image of a scanned object and a potential threat object within the object, in accordance with some embodiments of the present specification. Embodiments of the present specification generate a scanned image of an object, such as a baggage, which is displayed on a display with accompanying semantic information. The semantic information can include a classification of the image voxels in the object in different regions, such as including and not limited to one or more regions of interest and a background. In addition, the voxels in the image may be described as an "obstruction", wherein in embodiments, an "obstruction" is defined as a region where X-rays do not penetrate to provide sufficient information such that a classification can be made (thus, an "undeterminable" region), as determined by the algorithm. A region of interest may include a potential threat object (PTO), which may be positioned behind an obstructing object in the image. The background comprises spatial and contextual information relative to the region of interest. Referring to FIG. 3, a display 300 is used to display scanned images of the object. In some embodiments, the display includes a slice view 302 of the scanned object 304, shown on the left side of the display 300; and a 3D view 306 shown on the right side. The exemplary object shown in FIG. 3 is a baggage including two regions of interest highlighted within colored bounding boxes 308 and 310. In some embodiments, the bounding boxes for different semantic classes are color coded. In one embodiment, bounding boxes that are displayed around regions of interest are shown in yellow color. Each region of interest 308, 310 includes a PTO 312, 314, respectively, which are highlighted in a color. In some embodiments, the PTOs 312, 314 are highlighted in red color. In some embodiments, metallic objects are highlighted in blue color.

The display 300 includes a menu 316 with buttons or icons that may be used by a user to interface with the images shown in the display 300. The buttons in the menu 316 are interactive and used to modify or edit the displayed images by selecting the button. In some embodiments, the user may select a button or any item from the menu 316 by hovering a pointer over the option and clicking the option. Alternatively, the user may select an option by touching the option when the display is provided on a touchscreen. In some alternative embodiments, voice commands are provided to interface with the images through the menu 316. It should be noted that, in embodiments, voice command may be used to record and playback comments on the images.

In embodiments, the display 300 presents at least one scale 320 (320x, 320y) in association with the identification of the regions of interest 308, 310 that respectively include PTOs 312, 314. In other words, once a region of interest or PTO is identified, at least one scale 320 is generated and displayed to allow for easy assessment of a physical measurement of the PTO. In some embodiments, the scale 320 includes a horizontal scale 320x and a vertical scale 320y. In an embodiment, the horizontal and vertical scales 320x, 320y are calibrated or denominated in millimeters in increments of, for example, 200 millimeters. However, the denomination of the scale may be customized in other units such as, for example, centimeters.

Figure 4B:
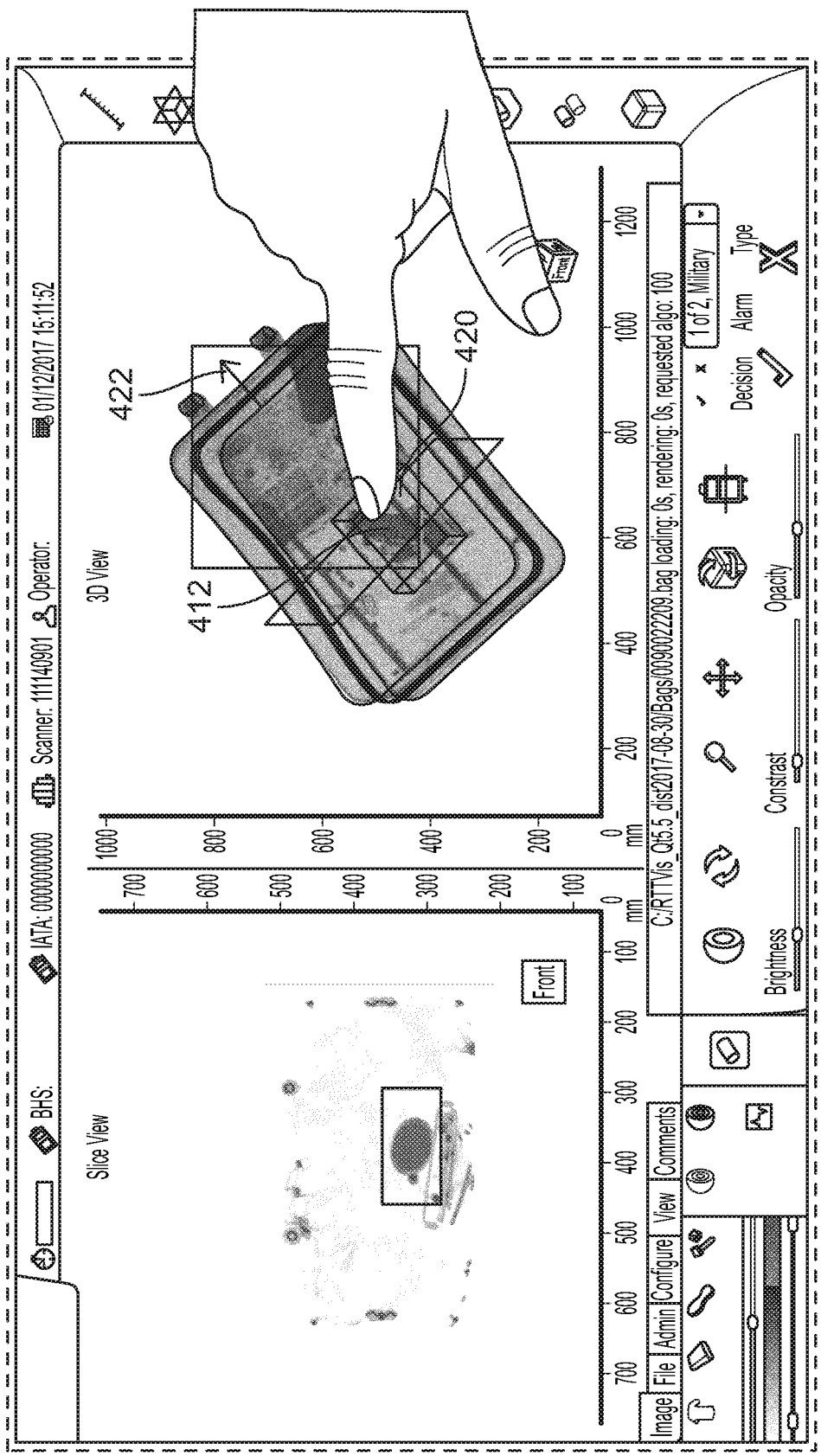
FIG. 4B illustrates an exemplary step of a user selecting (such as by clicking or touching) focus object to initiate the viewing of PTO in isolation, on a touch screen display, in accordance with some embodiments of the present specification.

It is desirable to view and inspect PTO 312 or 314 more closely and with greater detail. In embodiments, the present specification enables the user to isolate the image of a PTO in the display 300, so as to examine it in detail. FIG. 4A illustrates an exemplary step in the process of isolating image of a PTO 412 in a 3D view 406 within a display 400, in accordance with some embodiments of the present specification. The user may hover a mouse cursor 418 over the PTO 412 highlighted within a box 408, for visual cues. In some embodiments, visual cues are provided in the form of an outline 420 around the PTO 412 with at least one arrow tip 422, which indicate to the user that the PTO 412 can be brought in to focus. FIG. 4B illustrates an exemplary step of a user clicking or touching a focus object to initiate the viewing of PTO 412 in isolation, on a display (which may, in some embodiments, be a touchscreen display), in accordance with some embodiments of the present specification. In embodiments, any plane on PTO 412 that is primarily located in the baggage, and preferably, with no other object in front of the PTO or occluding the view of the PTO may be used for selecting the PTO.

Figure 6:
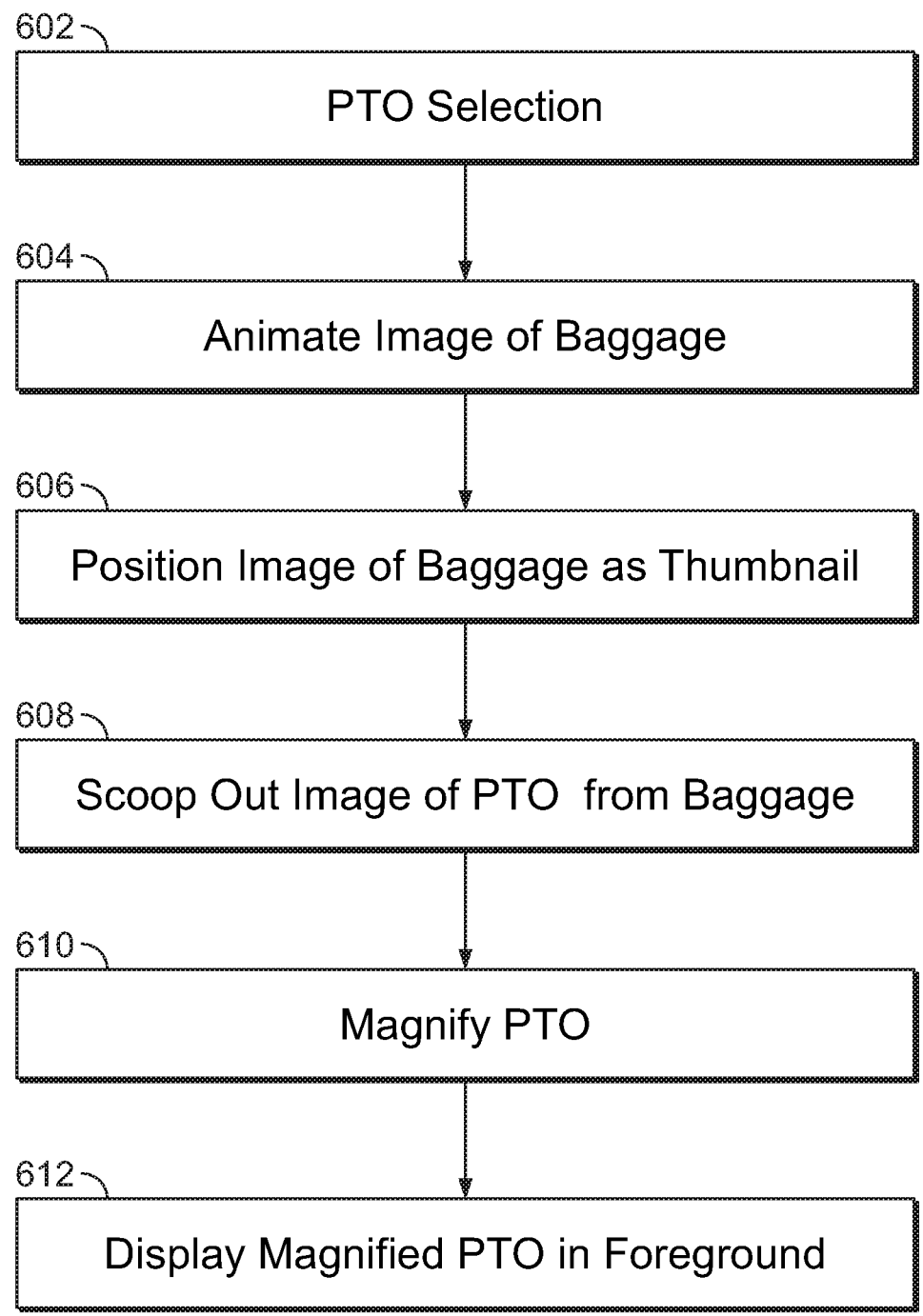
FIG. 6 illustrates a flow chart describing the process of FIGS. 5A to 5F, in accordance with some embodiments of the present specification.

FIGS. 5A to 5F illustrate an exemplary sequence of steps that provide an isolated display of a PTO 512 in a 3D display 506, while retaining spatial and contextual information of the PTO 512 relative to a baggage 524, in accordance with some embodiments of the present specification. FIG. 6 illustrates a flow chart describing the process of FIGS. 5A to 5F, in accordance with some embodiments of the present specification. Referring simultaneously to FIGS. 5A to 5F and FIG. 6, an exemplary sequence of steps that provide an isolated display of PTO 512 in 3D display 506, while retaining spatial and contextual information of the PTO 512 relative to baggage 524, are now described. At step 602, and referring to FIG. 5A, a user clicks on the PTO 512. In some embodiments, the user selects an option to bring PTO 512 in to focus, such as for example by interfacing with visual cues like an outline 520 around the PTO 512, also shown in context of FIG. 4B. In embodiments, the action of clicking or touching and thus selecting the PTO 512, isolates the PTO 512 from the image of the baggage 524 that contains the PTO 512. In alternative methods of interaction, the user may touch the image of the PTO on a touch screen, so as to select the image of the PTO. In further alternative embodiments for methods of interaction, a user may employ methods of eye-tracking and dwell. In still further alternative embodiments, a user may employ various augmented reality techniques, including "pull and grab". In embodiments, the object that is isolated is replaced with a void space having a plurality of dimensions, such as length, width, shape, and depth, equivalent to the dimensions of the object, thereby enabling the user to see beyond the object. Thus, objects that may have been otherwise obscured by the PTO are now visible and the context within which they are located is more apparent.

At step 604, and seen in FIG. 5B, image of the baggage 524 including the PTO 512 is animated into a background within the 3D view 506. At step 606, and in FIG. 5C, the image of the baggage 524 including the PTO 512 is animated further into the background within the 3D view 506, till the image is positioned in the upper right corner of the 3D view 506 in the form of a thumbnail. At step 608, and in FIG. 5D, the isolated image of the PTO 512 is brought forward with animation, in an action that is similar to scooping out the PTO 512 from within the baggage 524. At step 610, and in FIG. 5E, the extracted image of the PTO 512 is magnified and further brought forward towards a foreground within the 3D view 506. During the scooping out and magnification of the PTO 512, the baggage 524 remains positioned as a thumbnail in a corner of the view 506. The thumbnail is a Volume Rendering (VR) of the bag devoid of the PTO 512 voxels. At step 612, and in FIG. 5F, a magnified form of the PTO 512 relative to the baggage 524 is shown. The animation from FIGS. 5A to 5F enables the user to view the PTO in isolation while removing the noise or clutter in proximity of the PTO 512, such as other non-threat objects within baggage 524. FIG. 5F provides a magnified view of the PTO 512 to provide the user with greater details about the PTO 512. The process of scooping out the PTO 512 image from the baggage 524 brings the PTO 512 in to focus, while providing a context of space and orientation and position of the PTO 512 relative to its surrounding objects within the baggage 524. A scaling factor may be adjusted to define a bag image size and PTO size.

Figure 7:
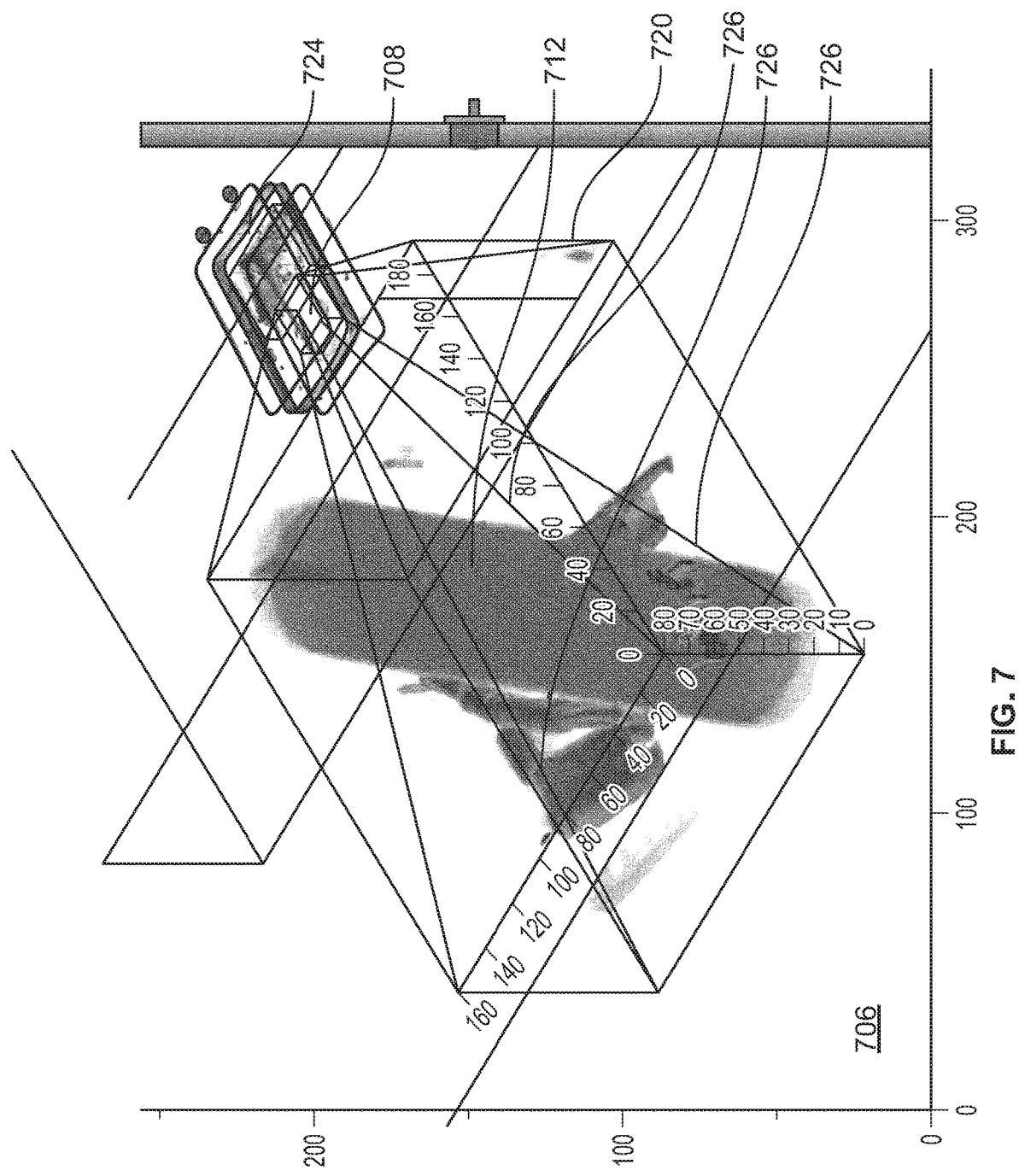
FIG. 7 illustrates the optional use of guide lines from an outlining box of a PTO image in focus in a 3D view, to its extracted region of interest in the context of the baggage image, to facilitate correct spatial comprehension during interaction with the isolated PTO, in accordance with some embodiments of the present specification.

In further embodiments, for visualization of the PTO 512 with correct spatial correspondence into the rest of the baggage 524, the contextual thumbnail view's orientation is synchronized with the focus of the PTO 512. Therefore, with the various tools 316 (FIG. 3) available to the user on the display 300, the user may rotate magnified image of the PTO 512 that is in focus, which also correspondingly rotates the thumbnail view of the baggage 524. FIG. 7 illustrates use of guide lines 726 from an outlining box 720 of a PTO 712 image in focus in a 3D view 706, to its extracted region of interest 708 in the context of the baggage 724 image, to facilitate correct spatial comprehension during interaction with the isolated PTO 712, in accordance with some embodiments of the present specification. The guide lines 726 establish a linear connection between the voxels of the PTO 712 and the region of interest within baggage 708 from where the PTO 712 has been extracted. In embodiments, the guide lines 726 portray how an extracted image portion of the PTO 712 is connected to the remaining portion of the image of the baggage 724 from where the PTO 712 was extracted. In some embodiments, the guide lines are visible to the user, whereas in some embodiments they are invisible. In some embodiments, when the user rotates the image of the PTO 712 and changes its orientation, the guide lines 726 guide the corresponding rotation of the baggage 724 in a synchronized fashion, in order to correspondingly change the orientation of the baggage 724. In some embodiments, when the user rotates the image of the PTO 712 and changes its orientation, the baggage 724 remains stationary (that is, does not rotate in synchronization with the rotation of the PTO 712) and instead, the guide lines 726 rotate and twist to show rotational movement of the PTO 712. Therefore, embodiments of the present specification facilitate correct spatial comprehension of a PTO within a scanned baggage, during inspection of the PTO. The guide lines facilitate illustration of how an extracted target object (PTO) is connected or related with the remaining image or surrounding context (baggage) such that when a user isolates and rotates the target object then a) in a first mode the remaining image or surrounding context (baggage) rotates in synchronization with the identified and isolated object (PTO), or b) in a second mode the remaining image or surrounding context (baggage) remains stationary with the guide lines rotating and twisting to show threat object (PTO) movement.

Figure 8B:
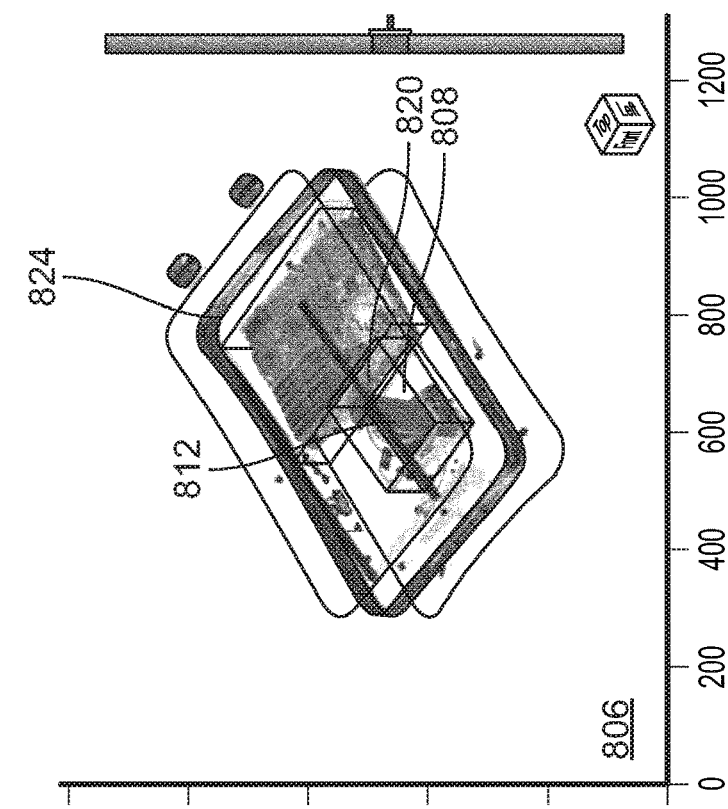
FIG. 8B illustrates an exemplary 3D view with the final magnified image of the baggage including the PTO, in accordance with some embodiments of the present specification.
Figure 8A:
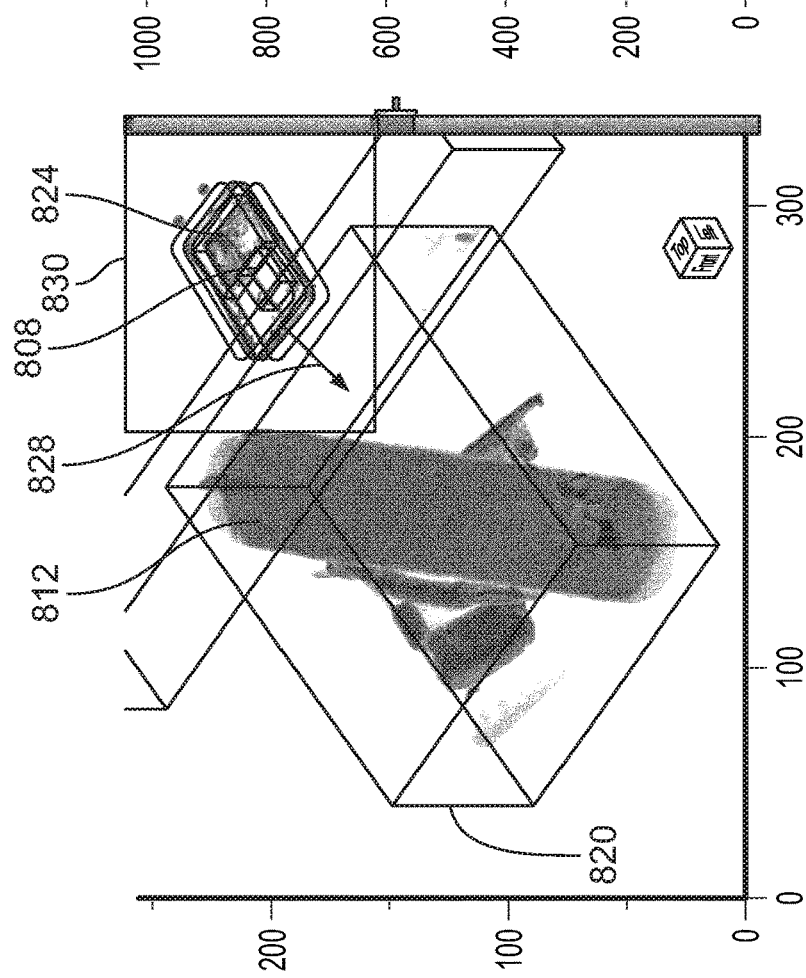
FIG. 8A illustrates an exemplary initial 3D view of a transitional animation that displays the transition of an isolated PTO back in to its region of interest within a baggage, in accordance with some embodiments of the present specification.

The user may eventually choose to return to one of the original scanned image and the image of the baggage 724 that includes the image of the PTO 712 within its region 708. FIG. 8A illustrates an exemplary initial 3D view 806 of a transitional animation that displays the transition of an isolated PTO 812 back into its region of interest 808 within a baggage 824, in accordance with some embodiments of the present specification. In some embodiments, the user selects an option from the menu provided along with the 3D view 806 to initiate the transition of the image. In some embodiments, the user clicks/touches the thumbnail of the baggage 824 to initiate the transition. In some embodiments, visual cues, such as and not exclusive to, an arrow 828 is shown within a frame 830 to indicate that the image of the baggage 824 may be brought back into full view within view 806. In some embodiments, the animated sequence shown in FIGS. 5A to 5F are repeated in a reverse order to finally provide a visualization of the baggage 824 including the PTO 812 within its origin region 808. In the animation, the PTO 812 is seen to be pushed back into the baggage 824 at its location and simultaneously the baggage 824 magnifies to fill up the whole 3D view 806. FIG. 8B illustrates an exemplary 3D view 806 with the final magnified image of the baggage 824 including the PTO 812, in accordance with some embodiments of the present specification. Therefore, the user is able to return from a focus view of the PTO 812 to visualize the complete baggage 824 by a single interaction with the display. Visualization of a focus (PTO) along with surrounding context (baggage) is challenging.

In embodiments of the present specification, the focus is brought into prominence using visualization techniques that resort to a distortion of a 'visualization space' such that more space is provided for a certain subset of data comprising the focus. Simultaneously, the rest of the visualization is compressed to still show the rest of the data as a context for improved user orientation. Visualization space traditionally refers to sampling density or increased illumination, or opacity. For instance a background including the context of the baggage (as described in the examples above) can be rendered with an increased transparency to fade it away, while the opacity of the focus including the PTO, which may or may not be in a foreground relative to its context, can be increased to bring it into prominence through the rest of the baggage.

In some embodiments, regions of the image of the context where an object occludes more important structures such as a PTO, can be displayed more sparsely than in those areas where no occlusion occurs. FIG. 9A illustrates a focus including a PTO 912 within a region of interest bound by a box 908 inside a context of a baggage 924, in accordance with some embodiments of the present specification. In the figure, voxels of the baggage 924 (context) that are outside the box 908, are rendered with a reduced opacity relative to the voxels of the objects within the box 908. FIG. 9B illustrates edge highlighting of the objects within the region of interest in the box 908, in accordance with some embodiments of the present specification. FIG. 9C illustrates voxels within the box 908 that includes the focus, shaded and rendered with different optical properties, lambertian shading, ambience, and with edge highlighting, in accordance with some embodiments of the present specification. In embodiments, gradient of dataset in the region of interest bound within the box 908 is computed to multiply the opacity contribution with the normalized gradient magnitude. The computation makes objects within the region of interest stand out by amplifying the transition (edge) between the PTO 912 and surrounding data, resulting in edge highlighting. The optical properties of the objects within the box 908 may have different diffuse and specular coefficients relative to the objects outside the box 908, so as to highlight the region of interest. In some embodiments, a sample distance used for ray integration in a ray caster within the PTO 912 bounding box 908 is increased, resulting in a higher fidelity rendering within the PTO 912. Therefore, with semantic segmentation less important parts of an image that occlude a significant portion within the image, can be removed to reveal the more important underlying information. Rendering the voxels of PTO 912 with a different colored hue, such as a reddish brown hue, also differentiates it from the context of the baggage 924. Samplings with several levels of sparsity and different optical properties in the PTO 912 and baggage 924 are possible to regulate the blending between focus and context. Since the PTO 912 comprises a small fraction of the total number of voxels in the scanned image, the increased time taken due to a higher sampling is minimal.

Figure 9E:
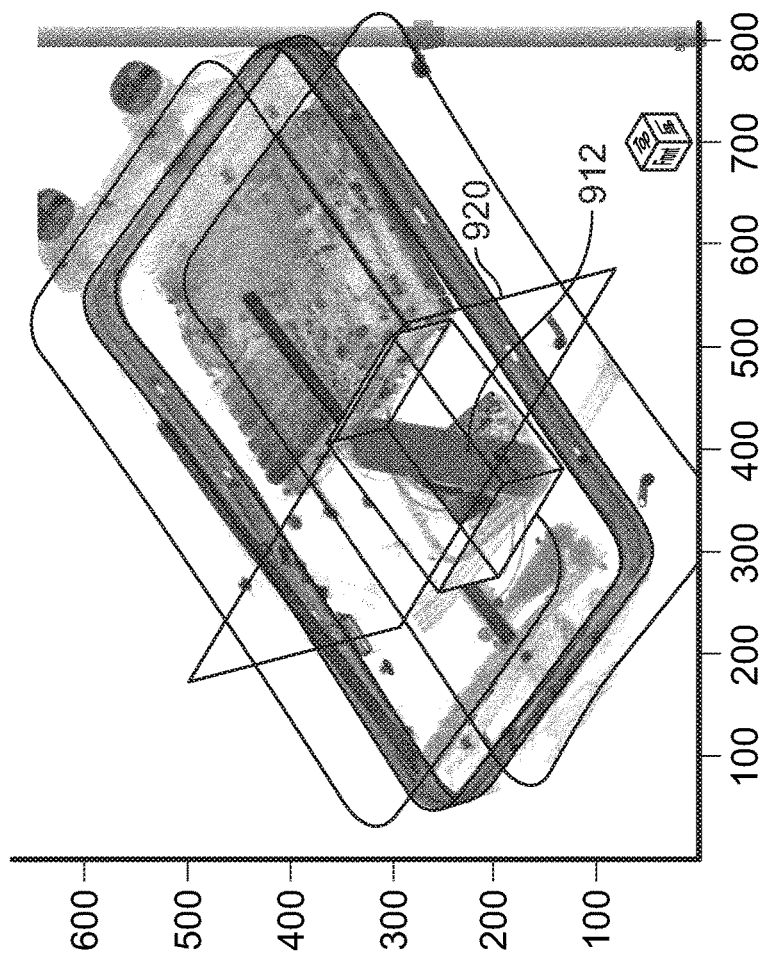
FIG. 9E is another illustration of the (PTO) focus displayed as un-occluded or unhindered, along with contextual information, whereby everything in front of the focus is dynamically cut away or removed, thus creating a virtual vision channel to visualize deep-seated PTOs.
Figure 9D:
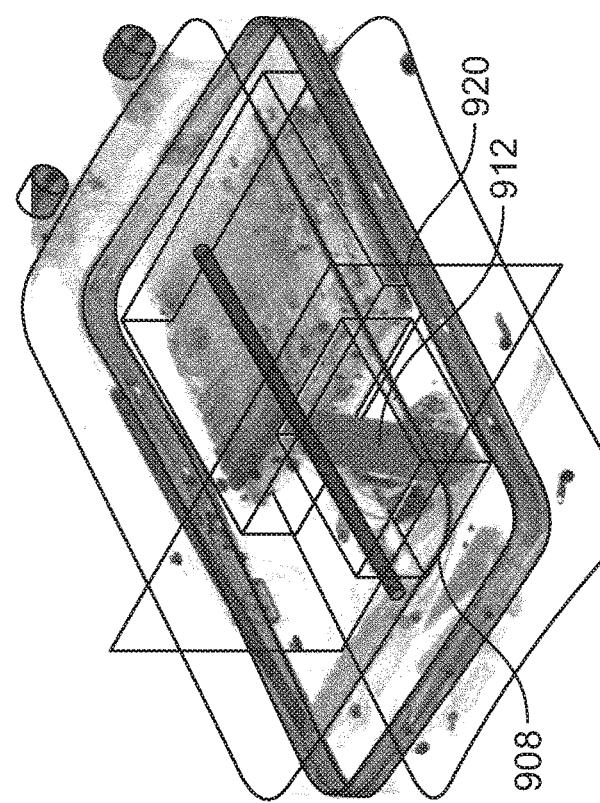
FIG. 9D illustrates the PTO (focus) displayed as un-occluded or unhindered, along with contextual information, whereby everything in front of the focus is dynamically cut away or removed, thus creating a virtual vision channel to visualize deep-seated PTOs.

FIG. 9D illustrates the PTO (focus) displayed as occluded and obstructed, along with contextual information, whereby everything in front of the focus 912 is dynamically cut away or removed, thus creating a virtual vision channel to visualize deep-seated PTOs. FIG. 9E is another illustration of the focus 912 displayed as un-occluded or unhindered, along with contextual information, whereby everything in front of the focus is dynamically cut away or removed, thus creating a virtual vision channel to visualize deep-seated PTOs. Referring both to FIGS. 9D and 9E, a virtual cut-away surface, or view-dependent poly-plane 920 is used to clip away anything in from of the ROI 908, as defined by the bounding box. This provides an unhindered vision channel for the focus while retaining the rest of the contextual imagery beside and behind it. Thus, as shown in FIG. 9E, the poly-plane 920 was used to clip off a top portion of the items on top of or in front of the PTO 912.

Figure 9F:
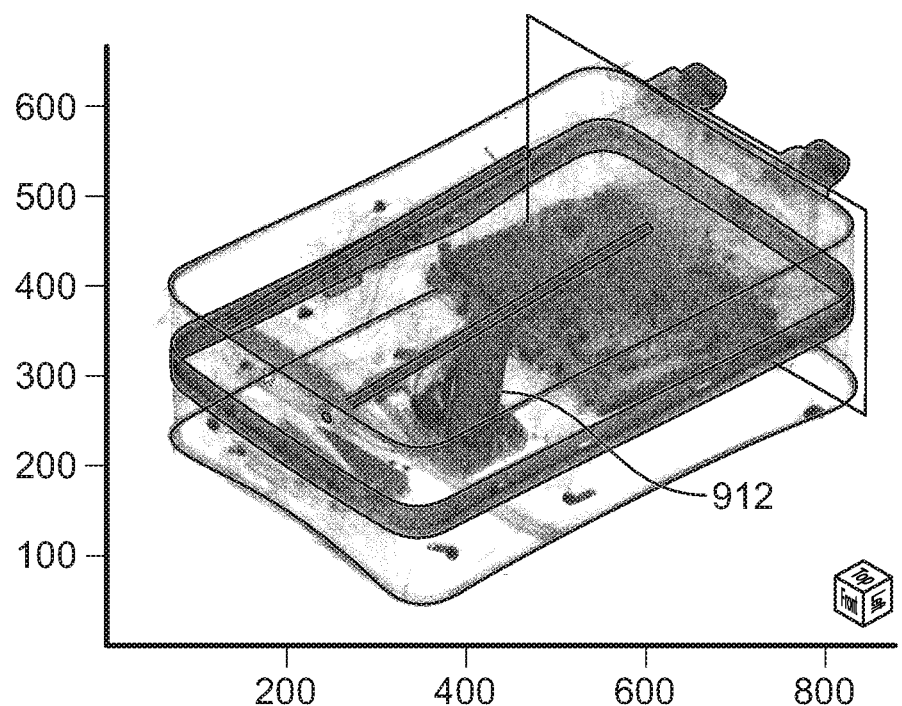
FIG. 9F is a first illustration wherein a user begins defining a region of interest around an object such that it can be isolated in the same manner as a PTO.
Figure 9G:
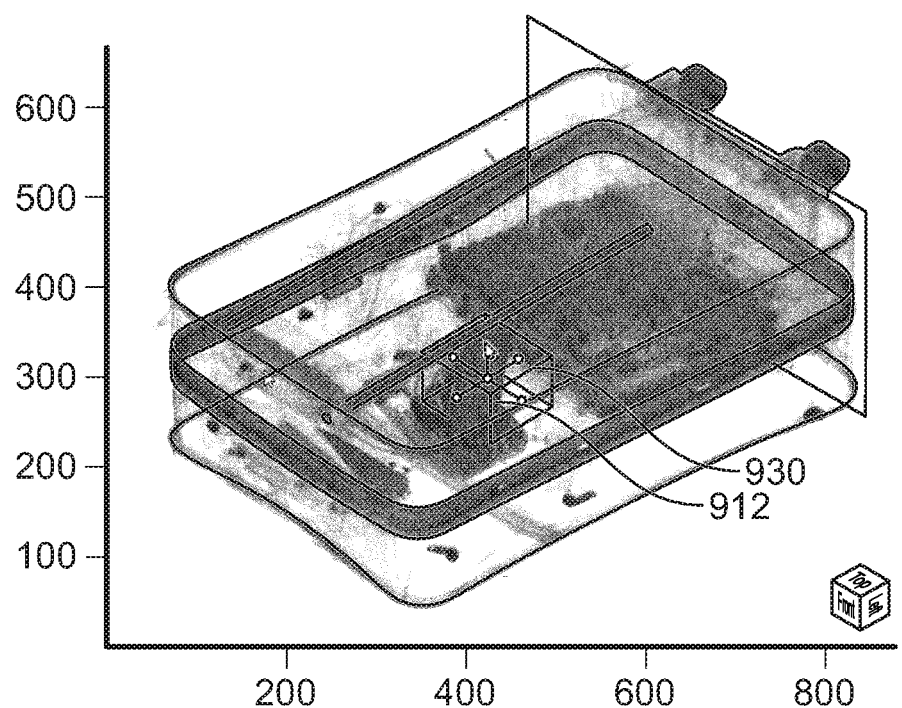
FIG. 9G is a second illustration wherein the region of interest is expanded.
Figure 9H:
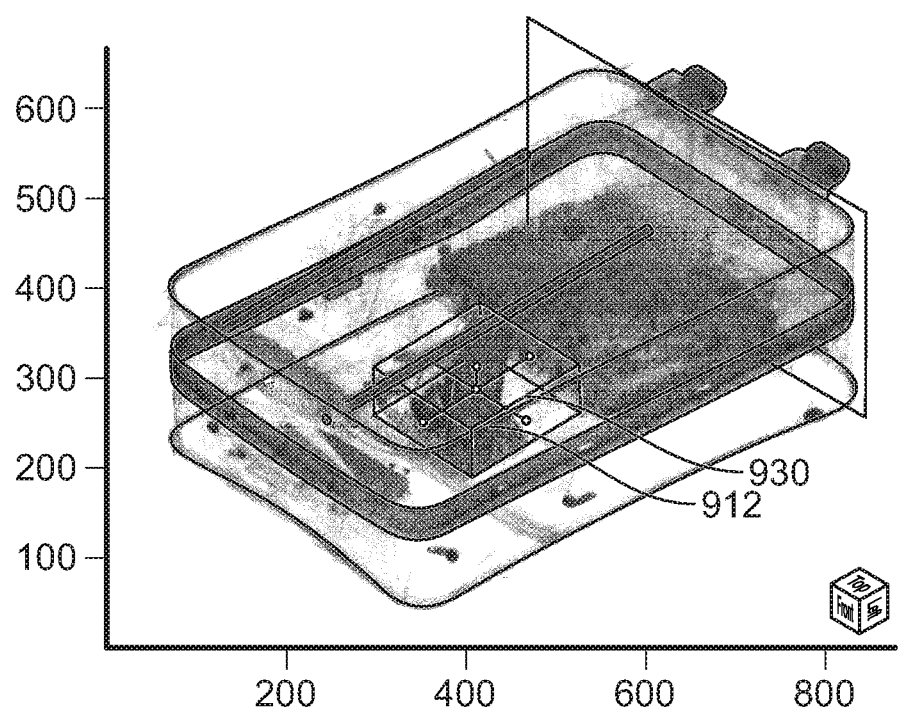
FIG. 9H is a third illustration wherein the region of interest is further defined and moved.

FIG. 9F is an illustration wherein a user begins defining a region of interest 930 (FIGS. 9G, 9H) around an object 912 such that it can be isolated in the same manner as a PTO. FIG. 9G shows the region of interest 930 being "grown" or "expanded" around the object 912 as a result of user manipulation of the display. FIG. 9H illustrates the region of interest 930 being further defined and moved such that it can be isolated in the same manner as a PTO. Thus, the same operations performed on the PTO as described above can be performed to isolate any object of interest within a baggage or other parcel.

Figure 10:
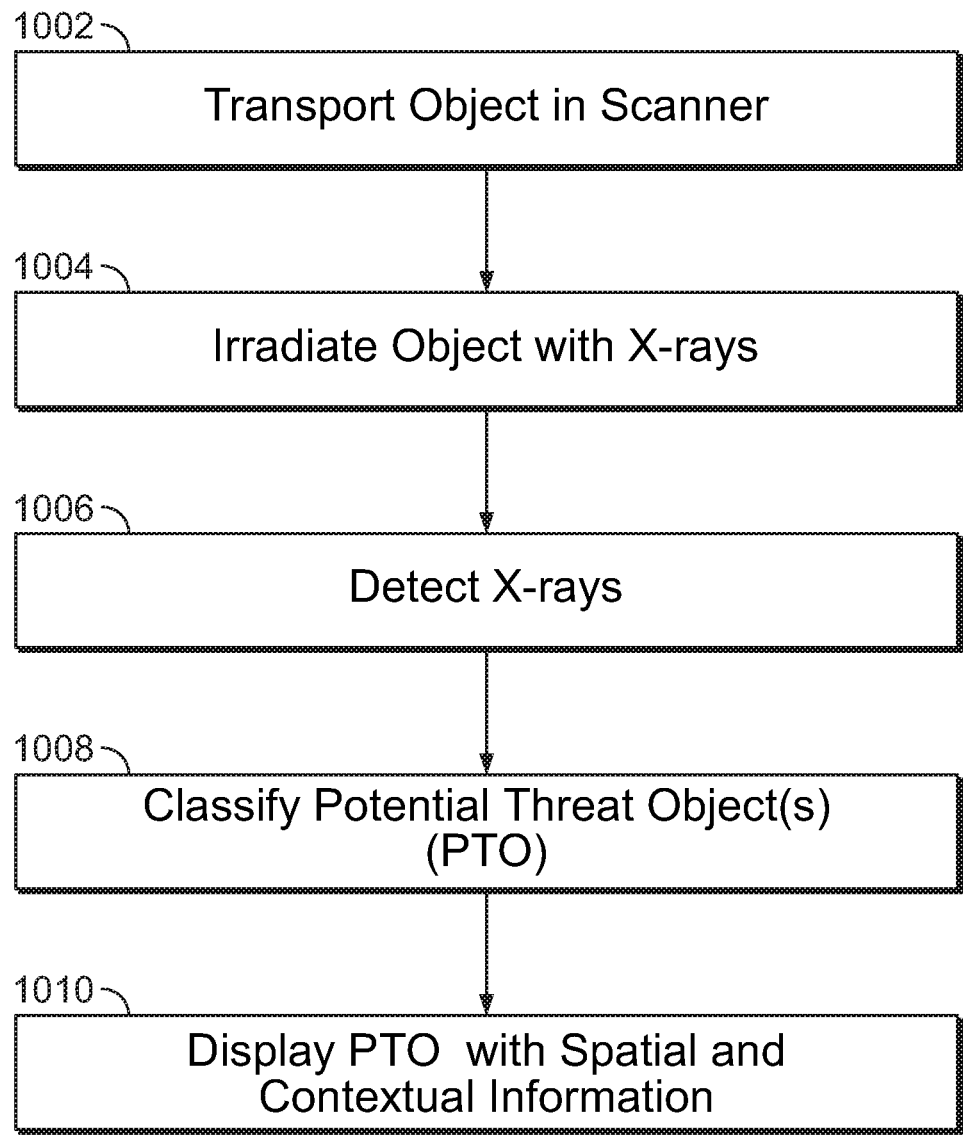
FIG. 10 illustrates a flow chart for an exemplary process adapted by some embodiments of the present specification to scan an object.

FIG. 10 illustrates a flow chart for an exemplary process adapted by some embodiments of the present specification to scan an object. At 1002, a scanning system is used to transport an object under inspection through the scanning volume. In some embodiments, the scanning system is deployed for security purposes for scanning of objects. In some embodiments, the scanning system is deployed for medical purposes for scanning living beings. At 1004, the object under inspection is irradiated with X-rays generated by a multi-focus X-ray source. The X-ray source has a plurality of X-ray source points arranged around the scanning volume. The X-ray sources are provide and arranged according to any of the known scanning methods including and not limited to CT scanners and RTT scanners. At 1006, the irradiated X-rays transmitted through the object under inspection are detected using a detector array positioned between the X-ray source and the scanning volume, wherein the detector array has a plurality of multi-energy detector modules arranged around the scanning volume. At 1008, reconstructed image data of the object under inspection is analyzed to identify a PTO within the object. In some embodiments, the process of analyzing comprises semantic classification of regions within the image. The semantic classification may identify regions with voxels including PTOs and other regions that do not include PTOs. At 1010, the PTO is displayed in isolation along with spatial and contextual information relative to the object under inspection, in accordance with the various embodiments described in context of FIGS. 5A to 5F, FIG. 7, FIGS. 8A, 8B and FIGS. 9A to 9H.

Aviation security screeners or operators are required to review and analyze scan images of baggage before clearing a piece of baggage that is to be loaded onto an airplane for a flight. The screeners are faced with the challenge of reviewing many bags within a short period of time. In a typical operation a bag that is rejected by a first level or stage screener is sent for further analysis to a second level or stage screener. The second level screener may spend more time for his/her analysis before making a final decision on the bag. If the bag is rejected by the second level screener then the bag is sent for a physical examination or hand search of the bag. Any observations or comments that can be communicated by the first level screener is valuable to the second level screener and helps him to make a decision on the bag within the limited time available.

Therefore, in accordance with some embodiments, the present specification recognizes the fact that an audible recording of the comments, where the first operator can speak his thoughts and observations in association with a scan image, are very useful. While the first operator records his observation(s) using a microphone, his hands are free without having to type in his comments using a keyboard and he can actively manipulate the scan image for quick analysis of the scan data. Likewise, the next level operator who is viewing the scan image can also manipulate the scan image while simultaneously listening to the recorded comments of the first level operator using a headphone and thus saving valuable time without having to read details or toggle between screens. The recorded audio comments associated with the scan image can also be used for audit purposes if required for TIP (Threat Image Projection) performance analysis or in case of an investigation.

In the following description, it should be noted that the system enables an operator to interactively record notes/comments or listen to notes/comments left by another operator, by clicking on it from the display or otherwise interacting with the scan to select the record functionality. In alternative methods of interaction, the user may touch any button provided on a GUI, which may be implemented on a touch screen, so as to select the appropriate action.

Figure 12:
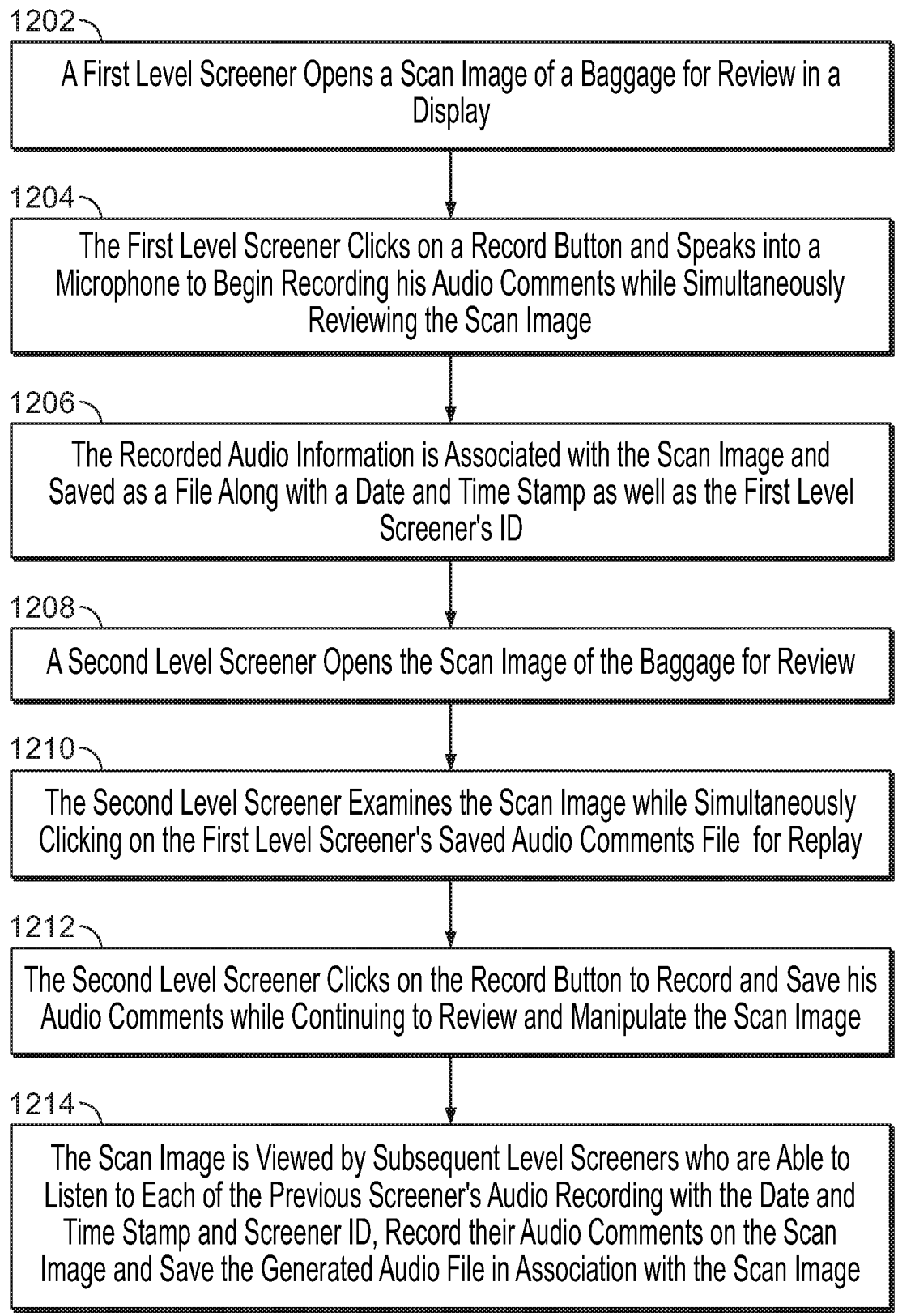
FIG. 12 is a flowchart describing the process of FIGS. 11A through 11F, in accordance with some embodiments of the present specification.

FIGS. 11A through 11F illustrate an exemplary sequence of steps that enable at least two security screeners or operators to record audio comments or observations related to a scan image of a bag, in accordance with some embodiments of the present specification. FIG. 12 is a flowchart describing the process of FIGS. 11A through 11F, in accordance with some embodiments of the present specification. Referring simultaneously to FIGS. 11A through 11F and FIG. 12, an exemplary sequence of steps that enable at least two security screeners or operators to record audio comments or observations related to a scan image of a bag, are now described. At step 1202, a first level screener opens a scan image of a baggage for review. The scan image is shown on a display, such as the display 300 of FIG. 3. In some embodiments, as shown in FIG. 11A, the display also provides a comments GUI (Graphical User Interface) window or tab 1105 that includes a text box 1107 and a record button or icon 1110. In some embodiments, the first level screener may enter textual comments 1106 in the text box 1107.

At step 1204, and referring to FIG. 11B, the first level screener clicks (or touch enables) the record button 1110 (FIG. 11A) and speaks into a microphone to begin recording his audio comments and observations while simultaneously reviewing the scan image. The record button 1110 toggles into a stop button 1111 (FIG. 11B) which when clicked (or touched) enables the screener to stop recording. In some embodiments, there is a predefined limit in terms of the amount of audio file storage available to the screener for recording. In some embodiments, the predefined audio file storage limit is provided in terms of a total time of recording. However, in alternate embodiments, the predefined audio file storage limit may be provided in terms of storage size. In some embodiments, an audio recording progress bar 1115 shows the amount of audio file storage being used by the screener during recording and the amount of audio file storage available for recording. A headset (comprising a microphone and earphones) is provided to all screeners to enable them to record their audio comments and listen to audio clips recorded by other screeners.

At step 1206, and referring to FIG. 11C, the first level screener finishes audio recording of his comments by clicking on the stop button 1111 (FIG. 11B). The recorded audio information is associated with the scan image and saved as a file 1117 along with a date and time stamp as well as the first level screener's ID (Identification). The saved audio file 1117 appears as an icon that can be clicked to play the file 1117. In some embodiments, the first level screener has an option to delete the file 1117 (by clicking a delete button 1118 associated with the file 1117) before making a decision on the bag. However, once the first level makes a decision on the bag, the file 1117 is automatically saved and cannot be deleted by the first level screener. Note that the stop button 1111 of FIG. 11B toggles back to the record button 1110 in FIG. 11C.

Assuming that the first level screener makes a decision that the bag contains a PTO and refers the decision to a second level screener then, at step 1208, the second level screener opens the scan image of the baggage for review. At step 1210, and referring to FIG. 11D, the second level screener examines the scan image while simultaneously clicking (or touching) on the first level operator's saved audio comments file 1117 for replay to help with analysis of the scan image and thus, help arrive at a final decision. The first level screener's textual comments 1106 are also visible to the second level screener. The second level screener can also see the ID of the previous screener (that is, the first level screener) and the time at which the audio comment was recorded. As shown in FIG. 11E, the second level screener can choose to add textual comments 1120 to the text box 1107 so that these comments 1120 appear sequentially below the first level screener's textual comments 1106. In FIG. 11E, is it shown that the second level screener is also listening to the saved audio comments file 1117.

At step 1212, and referring to FIG. 11F, the second level screener clicks on the record button 1110 and speaks into a microphone to begin recording audio comments and observations (to provide further details on the image observation) while continuing to review and manipulate the scan image. Once recorded, the second level screener's recorded audio information is also associated with the scan image and saved as a file 1125 along with a date and time stamp as well as with the second level screener's ID. The saved audio file 1125 appears as an icon next to the first level screener's audio file 1117.

At step 1214, the same scan image is viewed by subsequent level screeners wherein the subsequent level screeners are able to listen to each of the previous screener's audio recording with the date and time stamp and screener ID, record their audio comments and observations on the scan image and save the generated audio file in association with the scan image (along with their respective screener IDs and date and time stamps of generating the audio files).

In various embodiments, the audio comments and observations are useful for training purposes where the logic behind a screener's decision is analyzed. Thus, a scan image may be reviewed along with the associated one or more audio comments to understand the rationale behind the decisions made by corresponding one or more screeners. The audio comments can be used for performance analysis of the screeners. The audio comments can also be used for coaching new screeners on how to use or implement the audio comments.

While reviewing scan images for security purposes screeners are often presented with images wherein the threat voxels are highlighted in a predefined color or mask such as, for example, red color for PTOs and blue color for metallic objects. The voxels or areas that are to be visually highlighted are determined by a threat detection algorithm that processes the scan images. The highlighted mask or surfaces help the screener or operator to focus on the potential threat objects so that he can provide a decision on the threat quickly. The mask, however, also hides the surface and original image of the object. The present specification recognizes that it would be advantageous for the screener to be able to see beyond the mask so that the potential threat object is revealed.

Accordingly, in some embodiments, the screener is enabled to modulate the mask intensity. That is, the transparency of the mask can be increased or decreased to reveal and display the original object thereby providing a convenient and useful feature for the screener to study and examine a potential threat object. Thus the operator can see the original image of the object and also quickly see the areas or regions of the object that have triggered the threat detection algorithm as indicated by red highlighted areas.

Figure 13A:
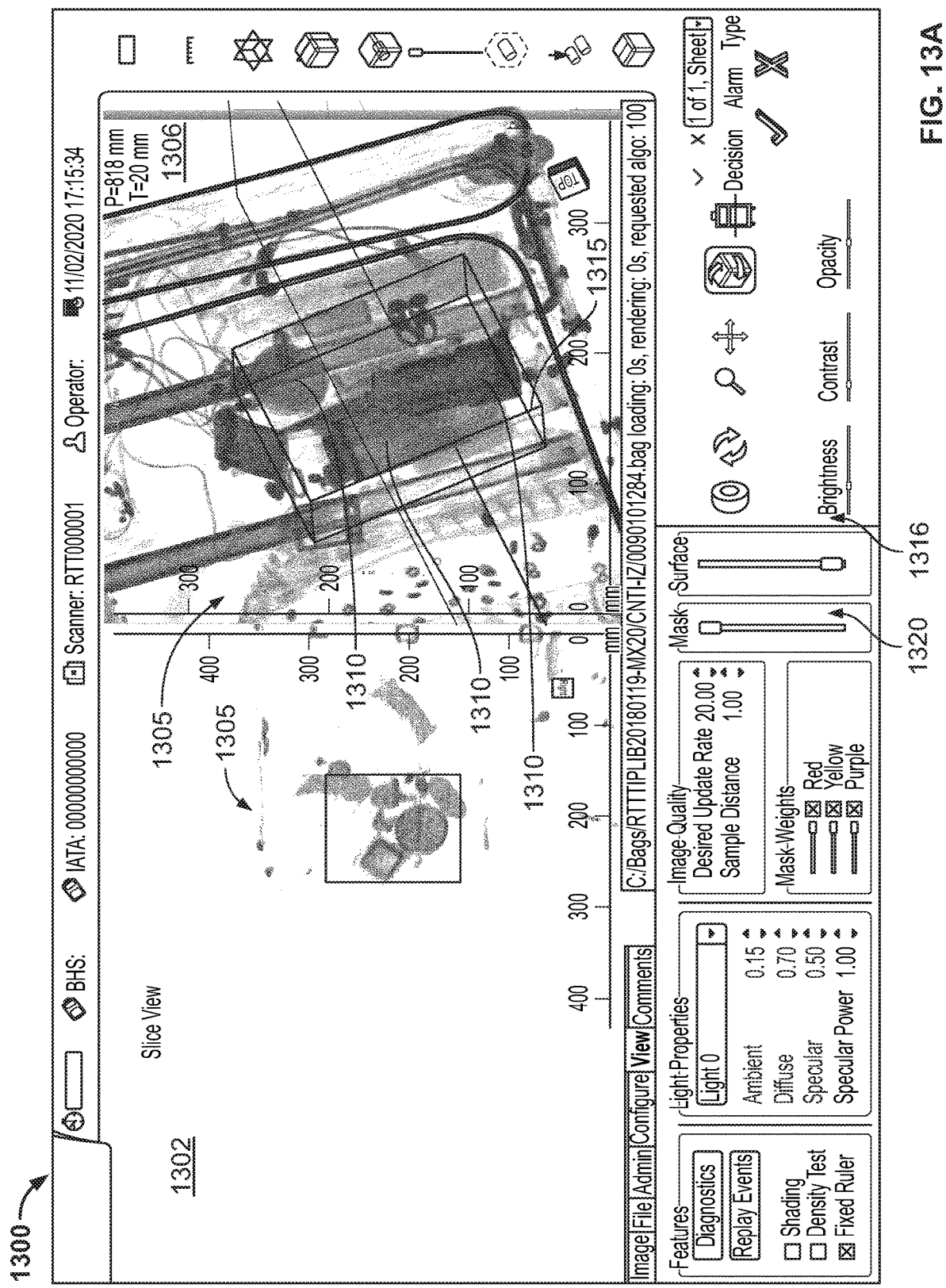
FIG. 13A illustrates a first step in a method for enabling a security screener to modulate the mask intensity of highlighted one or more PTOs in a scan image of a bag, in accordance with some embodiments of the present specification.

FIGS. 13A through 13E illustrate an exemplary sequence of steps that enable a security screener to modulate the mask intensity or blend factor of highlighted one or more PTOs in a scan image of a bag, in accordance with some embodiments of the present specification. FIG. 14 is a flowchart describing the process of FIGS. 13A through 13E, in accordance with some embodiments of the present specification. Referring simultaneously to FIGS. 13A through 13E and FIG. 14, an exemplary sequence of steps that enable a screener to control the intensity of mask used to highlight PTOs in a scan image of a bag, are now described. At step 1402, and referring to FIG. 13A, the screener opens a scan image of a baggage 1305 for review, in a display 1300, wherein one or more PTOs 1310 are displayed with a colored mask such as, for example, red. In accordance with some embodiments, the display 1300 includes a slice view 1302 of the scanned baggage 1305, shown on the left side of the display 1300 and a 3D view 1306 shown on the right side. The scanned image of the baggage 1305 includes, as an illustration, three PTOs 1310 highlighted within a colored bounding box 1315. The display 1300 includes a menu 1316 with buttons or icons that may be used by the screener to interface with the scan images shown in the display 1300. In accordance with some embodiments, the menu 1316 includes a mask control slider 1320 that can be manipulated (upwards or downwards) by the screener to increase or decrease the intensity or blend factor of the red colored mask of the PTOs 1310. In FIG. 13A, the mask control slider 1320 is at its top most position meaning thereby that the intensity of the red mask is highest and the mask layer is almost opaque.

Figure 13B:
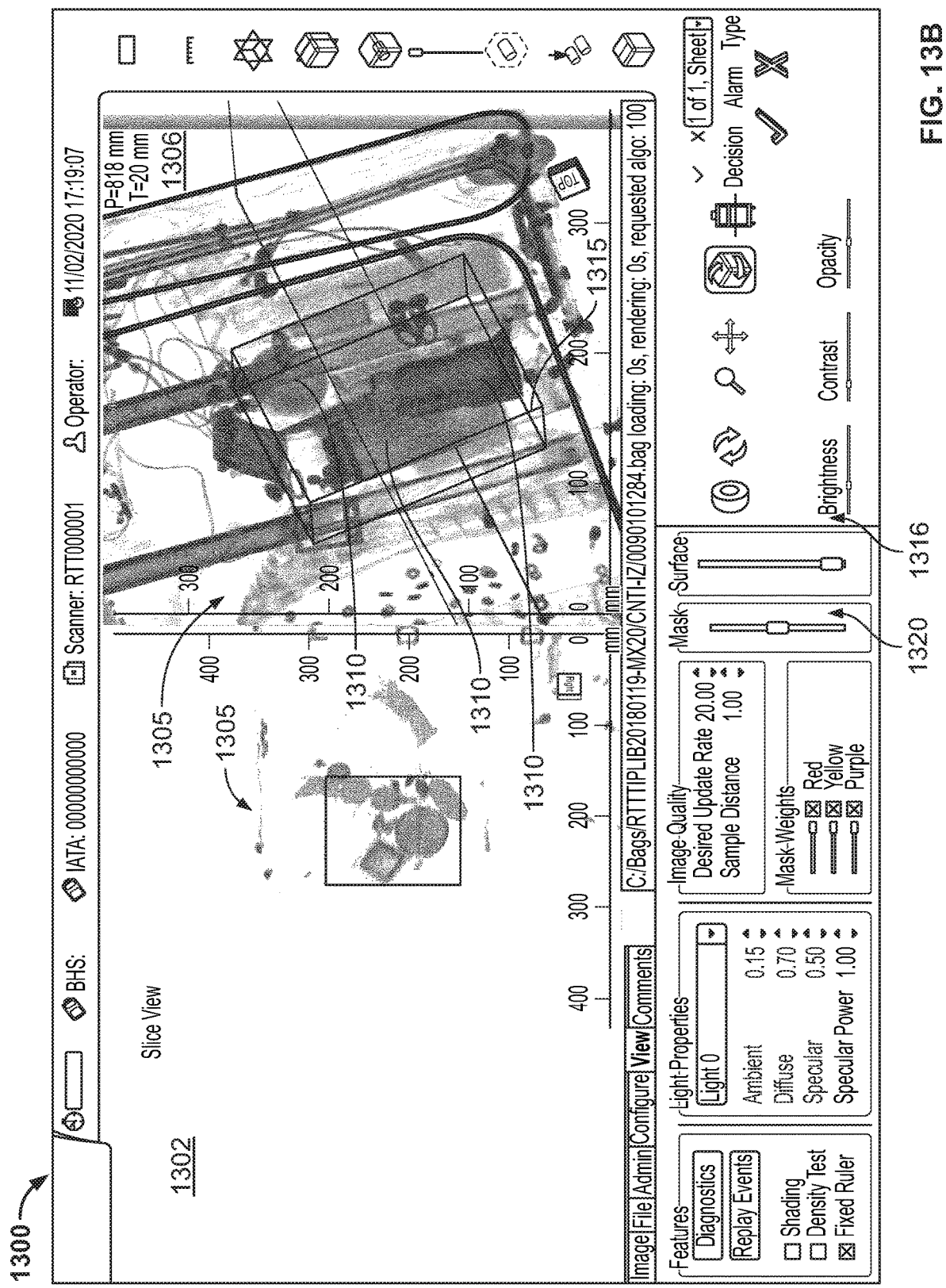
FIG. 13B illustrates a second step in a method for enabling the security screener to modulate the mask intensity of the highlighted one or more PTOs in the scan image of the bag, in accordance with some embodiments of the present specification.
Figure 14:
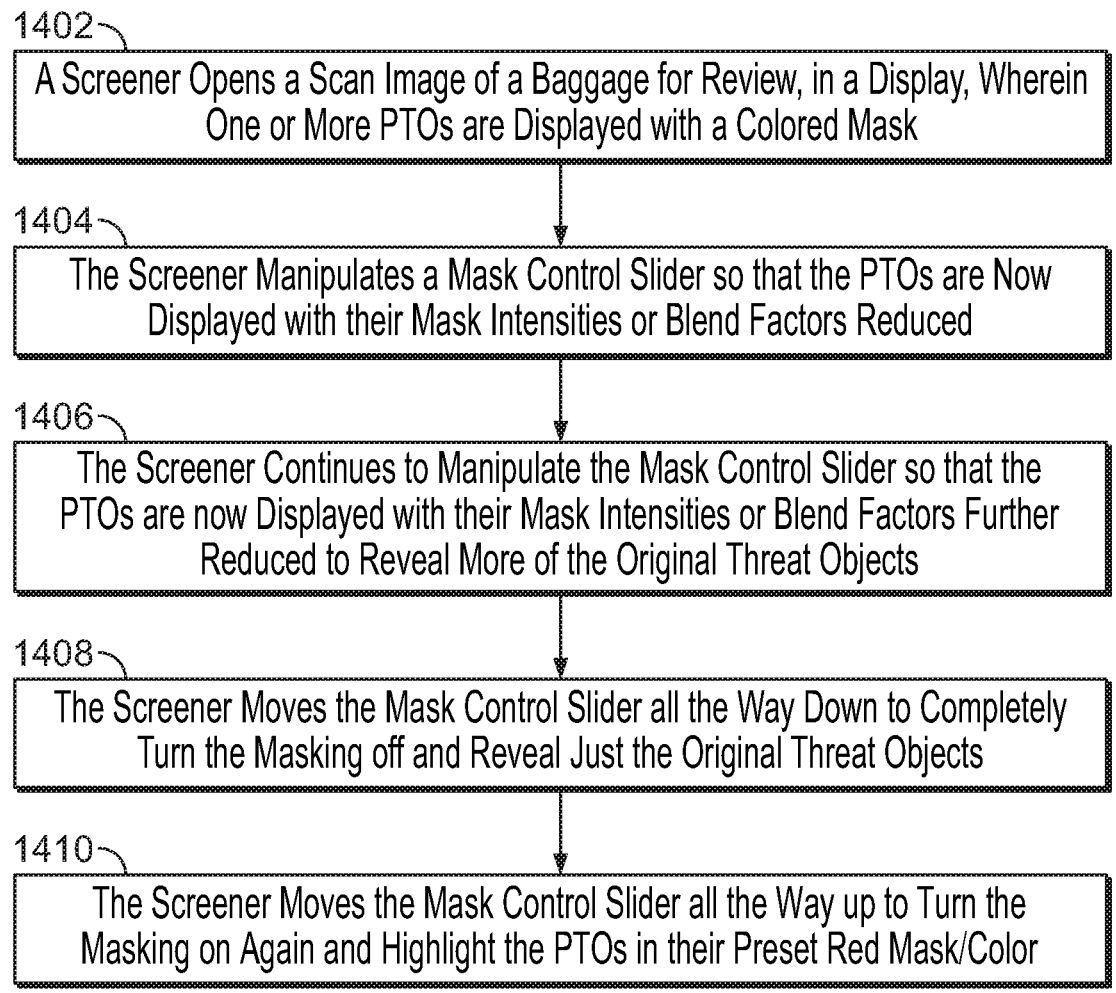
FIG. 14 is a flowchart describing the process of FIGS. 13A through 13E, in accordance with some embodiments of the present specification.

At step 1404, and referring to FIG. 13B, the screener modulates the mask intensity or blend factor by manipulating the slider 1320. As shown, the slider 1320 is moved downwards thereby decreasing the mask intensity or blend factor such that the mask color is decreased and more of the original threat objects 1310 are displayed. In other words, the PTOs 1310 are now displayed with their mask intensities or blend factors reduced.

Figure 13C:
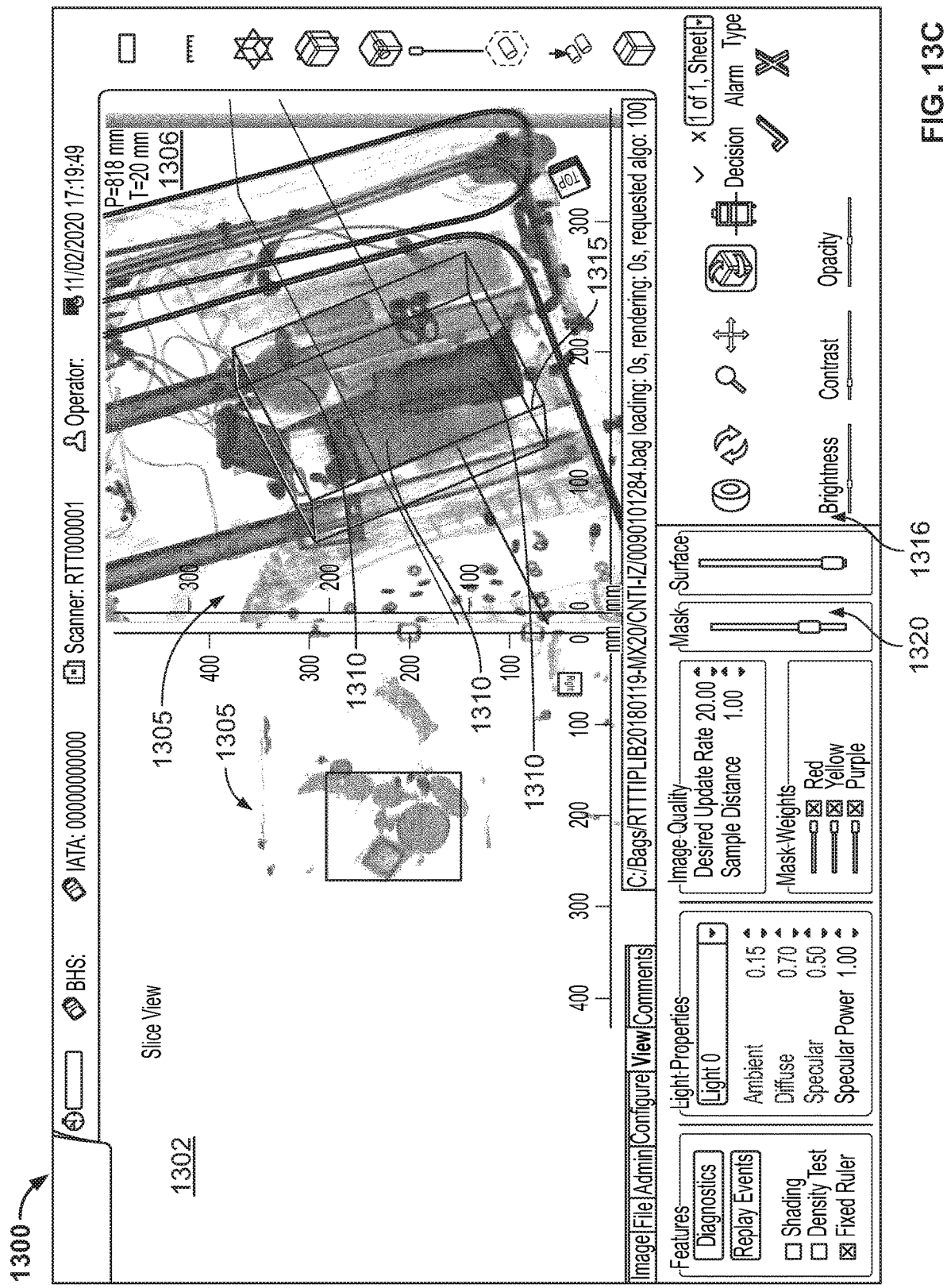
FIG. 13C illustrates a third step in a method for enabling the security screener to modulate the mask intensity of the highlighted one or more PTOs in the scan image of the bag, in accordance with some embodiments of the present specification.

At step 1406, and referring to FIG. 13C, the screener continues to modulate the mask intensity or blend factor using the slider 1320. As shown, the slider 1320 is moved further downwards thereby decreasing the mask intensity or blend factor further such that the mask color is further reduced to reveal more of the original threat objects 1310. The mask layer is now more transparent (compared to that in FIG. 13B) showing the regions and/or surfaces on the PTOs 1310 that are more likely to be the threat.

Figure 13D:
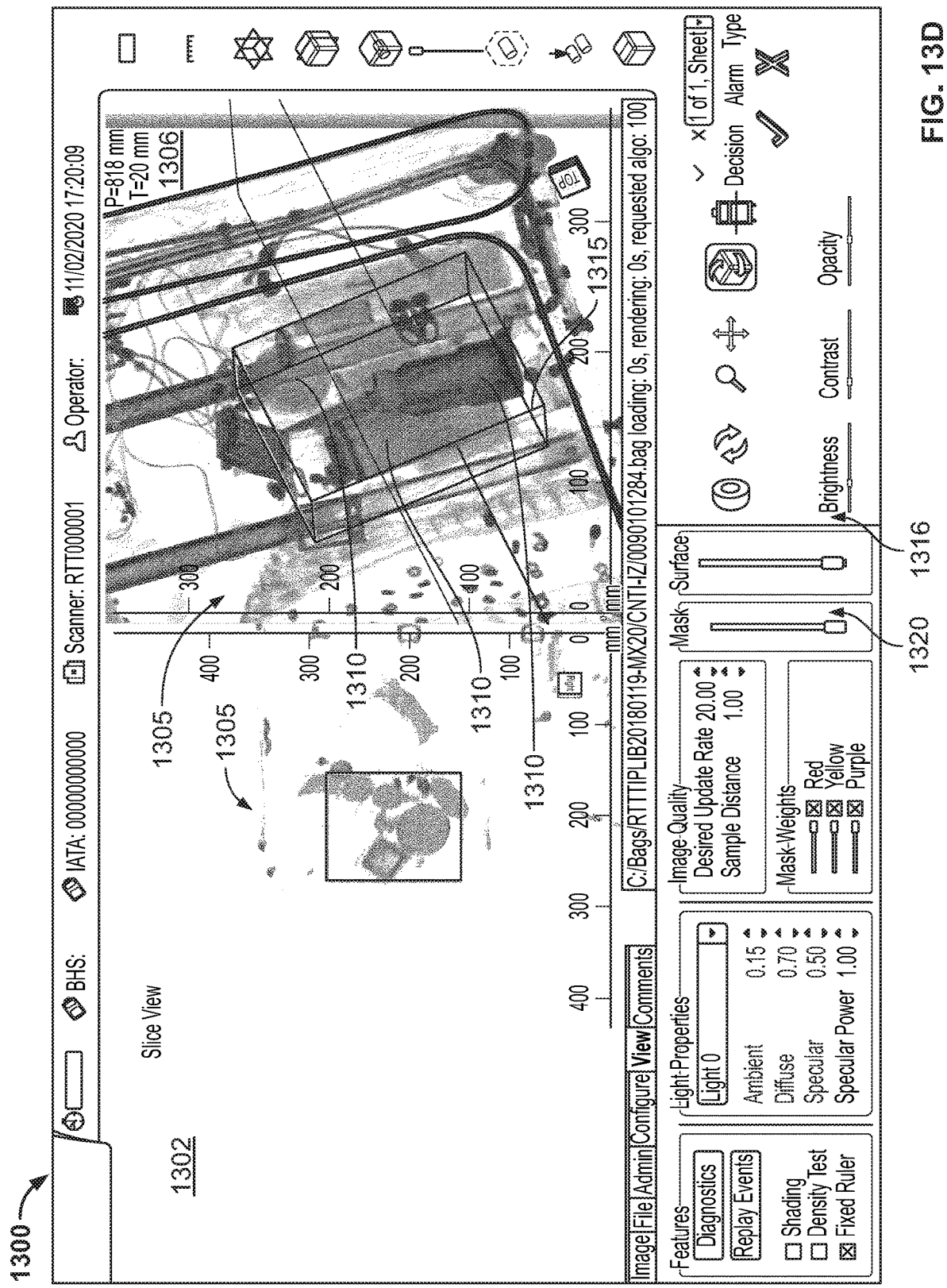
FIG. 13D illustrates a fourth step in a method for enabling the security screener to modulate the mask intensity of the highlighted one or more PTOs in the scan image of the bag, in accordance with some embodiments of the present specification.
Figure 13E:
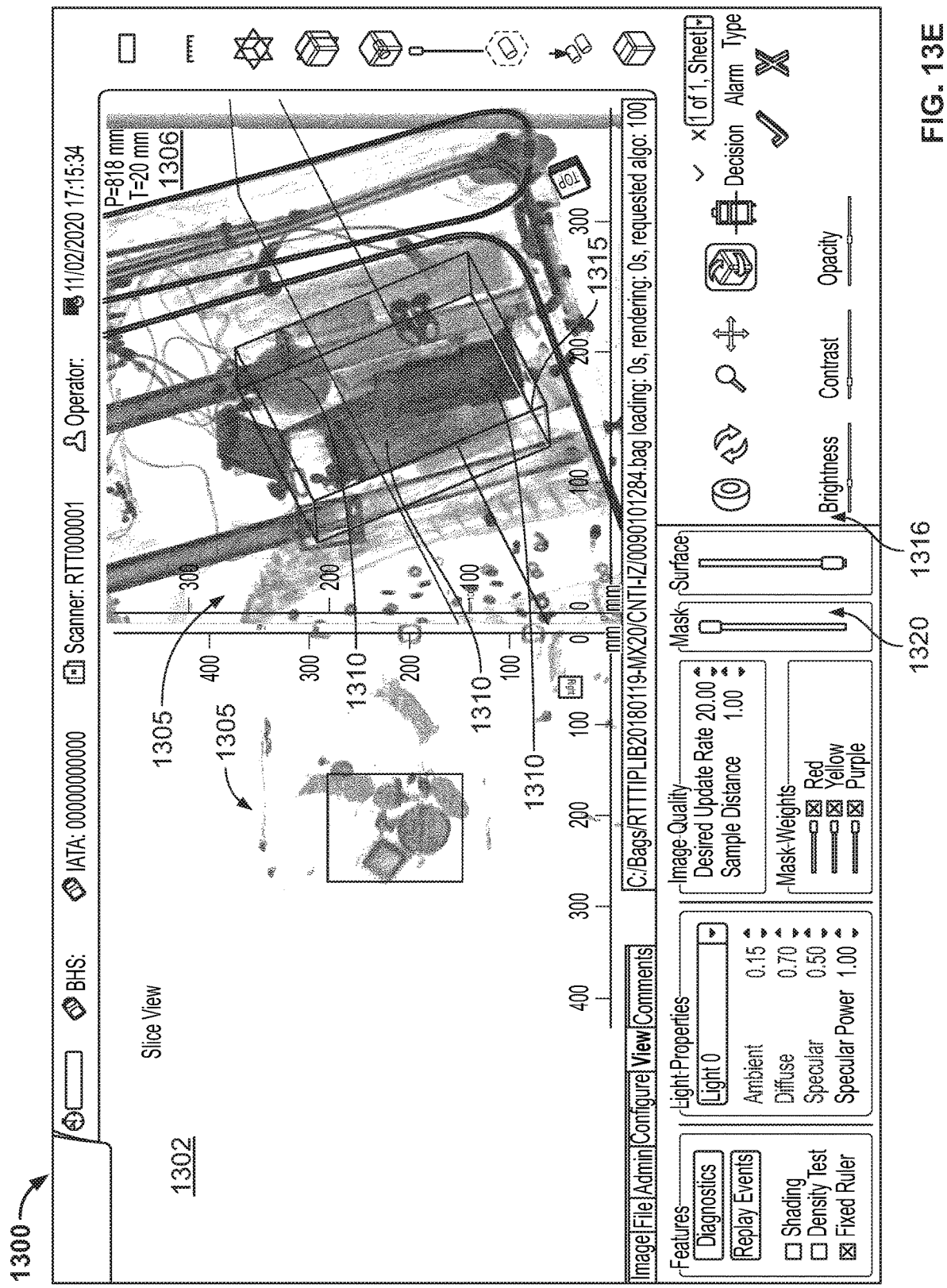
FIG. 13E illustrates a fifth step in a method for enabling the security screener to modulate the mask intensity of the highlighted one or more PTOs in the scan image of the bag, in accordance with some embodiments of the present specification.

At step 1408, and referring to FIG. 13D, the screener moves the slider 1320 all the way down to completely turn the masking off. As a result, the PTOs 1310 are displayed in their original form with no mask layer on them. Consequently, the screener can have a clear visibility of the objects 1310 in their respective original forms. Thus, in this step, the masking intensity or blend factor is completely removed to reveal just the underlying objects. At step 1410, and referring to FIG. 13E, the screener moves the slider 1320 all the way up to turn the masking on again and highlight the PTOs 1310 in their red mask/color. In other words, the screener re-instates the mask with the blend factor at the pre-set value so that the threat detection algorithm results are completely overlaid on the objects and the threat regions 1310 are once again displayed with full intensity.

It should be appreciated that using the mask intensity or blend factor modulation method of FIG. 14, a screener can easily correlate the threat detected areas with the original object to help him with the analysis and arrive at a decision on the object quickly.

Embodiments of the present specification provide advances in state of the art 3D visualization thereby enabling better appreciation and instant visual evaluation of objects in a scanned image. The methods described herein enable intuitive and instant interaction for a Transport and Security Administrator (TSA) operator to analyze PTOs with surrounding contextual information thereby increasing the efficiency and reducing the analysis time for the screener operator. Embodiments of the present specification also facilitate an ergonomic way to manipulate the images when implemented on a touch screen to make the interaction more user friendly and easier to use.

The above examples are merely illustrative of the many applications of the system and method of present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. A method of scanning an object using an X-ray scanner having a scanning volume, comprising:
moving the object through the scanning volume;
irradiating the object with X-rays generated by a plurality of X-ray sources arranged around the scanning volume;
detecting X-rays transmitted through the object using a detector array positioned around the scanning volume, wherein the detector array comprises a plurality of multi-energy detector modules;
generating reconstructed image data of the object being inspected;
displaying the reconstructed image data as an image on a display;
receiving a first interaction of an area of the display that visually depicts a portion of the reconstructed image data and, in response to the first interaction, visually isolating said portion of the reconstructed image data from a remainder of the portion of the reconstructed image data, wherein the visual isolating comprises replacing the portion of the reconstructed image data with a transparent void having dimensions equivalent to the portion of the reconstructed image data;
identifying voxels of a potential threat object in the voxels of the image of the object; and
highlighting the potential threat object on the display using at least one of spatial or contextual information.

2. The method of claim 1, wherein highlighting the potential threat object comprises presenting a visually perceptible bounding box in the image.

3. The method of claim 1, wherein highlighting the potential threat object comprises associating with the voxels of the potential threat object a first set of optical properties that are different from a second set of optical properties of remaining voxels of the object in the image.

4. The method of claim 3, wherein the first set of optical properties comprises at least one of illuminating the voxels of the potential threat object with a color that is different from remaining voxels of the object in the image, edge highlighting, or sampling.

5. The method of claim 3, wherein the first set of optical properties comprises illuminating the voxels of the potential threat object with an opacity that is different from remaining voxels of the object in the image.

6. The method of claim 1, wherein the plurality of X-ray sources are contained in a multi-focus X-ray source arranged around the scanning volume.

7. The method of claim 6, wherein the plurality of X-ray sources are a plurality of X-ray source points in the multi-focus X-ray source.

8. The method of claim 1, further comprising animating the image of the object and the potential threat object.

9. The method of claim 1, wherein highlighting the potential threat object comprises magnifying a visual display of the potential threat object.

10. The method of claim 1, wherein highlighting comprises removing portions of the reconstructed image data that occlude a view of the potential threat object by executing a view dependent virtual cut-away or rendering occluding portions of the reconstructed image data as transparent.

11. The method of claim 1, further comprising displaying the potential threat object in a foreground by moving a visual position of the potential threat object from a first position on the display to a second position on the display, wherein the second position visually appears closer to a viewer on the display relative to the first position.

12. The method of claim 1, wherein highlighting the potential threat object comprises diminishing a remainder of the image after visually highlighting the potential threat object.

13. The method of claim 1, further comprising displaying a portion of the image that is not the potential threat object in a background by moving a visual position of the portion of the image that is not the potential threat object on the display on to a second position on the display, wherein the second position appears farther away to a viewer on the display relative to the first position.

14. The method of claim 13, wherein the second position is in a thumbnail on the display.

15. The method of claim 13, wherein the second position is in a corner of the display.

16. The method of claim 1, further comprising enabling a user to interact with the spatial and/or contextual information.

17. The method of claim 1, wherein the visual isolating comprises modifying a visual scale of the portion of the reconstructed image data to make the portion of the reconstructed image data appear visually larger than the portion of the reconstructed image data prior to the first interaction.

18. The method of claim 1, wherein a plurality of guide lines maintain spatial alignment between said visually isolated portion and said remainder of the reconstructed image data.

19. The method of claim 1, where a scale is provided along the visually isolated portion to indicate a physical measurement.

20. The method of claim 19, where the display comprises a touch screen and the interactive identification is enabled by touch operations on the touch screen.

21. The method of claim 1, wherein, in response to a second interaction with the area of the display that depicts the portion of the reconstructed image data, visually placing the portion of the reconstructed image data back into a thumbnail such that it is in the same visual configuration as shown prior to the first interaction.

22. The method of claim 1, further comprising enabling the user to select any portion of the visually displayed reconstructed image data to be isolated such that the potential threat object is in a foreground of the display and a remainder of the image is visually positioned in a corner of the display as a thumbnail.

\* \* \* \* \*